(12) United States Patent
Miyazawa

(10) Patent No.: US 7,619,599 B2
(45) Date of Patent: Nov. 17, 2009

(54) OPTICAL SCANNING DEVICE, METHOD OF CONTROLLING OPTICAL SCANNING DEVICE, AND IMAGE DISPLAY APPARATUS

(75) Inventor: Yasunaga Miyazawa, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 670 days.

(21) Appl. No.: 11/362,801

(22) Filed: Feb. 28, 2006

(65) Prior Publication Data

US 2007/0012875 A1    Jan. 18, 2007

(30) Foreign Application Priority Data

Jul. 14, 2005    (JP) .............................. 2005-205809

(51) Int. Cl.
*G09G 3/34*    (2006.01)
(52) U.S. Cl. .......................... 345/84; 345/204; 345/207
(58) Field of Classification Search ................... 345/84, 345/204, 207
See application file for complete search history.

(56) References Cited

U.S. PATENT DOCUMENTS 5,894,123 A * 4/1999 Ohtomo et al. ............. 250/236
7,230,657 B2 * 6/2007 Childers et al. ............. 348/745
2003/0215156 A1 * 11/2003 Rieger ........................ 382/276

FOREIGN PATENT DOCUMENTS

JP    A 2003-21804    1/2003
JP    A 2003-172900   6/2003

* cited by examiner

*Primary Examiner*—Richard Hjerpe
*Assistant Examiner*—Leonid Shapiro
(74) *Attorney, Agent, or Firm*—Oliff & Berridge, PLC

(57) ABSTRACT

An optical scanning device, which scans a plurality of color light components so as to display an image, includes a light source unit that supplies a plurality of light beams, and a scanning unit that repeatedly scans each light beam from the light source unit in a first direction and a second direction in a region to be irradiated. The scanning unit is driven such that a frequency for scanning the light beam in the first direction becomes higher than a frequency for scanning the light beam in the second direction, and such that different light beams of the same color light component are allocated to at least some pixels of the image whenever the light beam is scanned in the second direction in the region to be irradiated.

15 Claims, 18 Drawing Sheets

OPTICAL SCANNING DEVICE, METHOD OF CONTROLLING OPTICAL SCANNING DEVICE, AND IMAGE DISPLAY APPARATUS

BACKGROUND

1. Technical Field

The present invention relates to an optical scanning device, to a method of controlling an optical scanning device, and to an image forming apparatus. More specifically, the present invention relates to an optical scanning device which scans laser light modulated according to image signals so as to display images.

2. Related Art

In an image display apparatus which scans laser light so as to display images, an optical scanning device for scanning laser light is used. The optical scanning device scans laser light modulated according to image signals in a two-dimensional direction. The image display apparatus causes laser light from the optical scanning device to be incident on a screen or the like so as to display images. In order to modulate laser light, in general, a pulse width modulation (hereinafter, referred to as 'PWM') method, in which a pulse width for turning on laser light is changed according to image signals, is used. In one frame of an image, in order to express grayscale levels according to image signals for all pixels, the pulse width of the minimum unit needs to be significantly small. As the number of pixels of an image is increased or as the number of grayscale levels of an image is increased, the minimum unit of the pulse width becomes smaller. In a high output laser light source, it is very difficult to perform switching according to the small pulse width accurately and at high speed. Accordingly, when it is difficult to increase a modulation frequency, scanning may be shared by using a plurality of laser light sources. For example, when the optical scanning device scans laser light in horizontal and vertical directions of a region to be irradiated, if a frequency for scanning laser light is higher in the horizontal direction than in the vertical direction, scanning may be shared by arranging the plurality of laser light sources in the vertical direction in a row. When the plurality of laser light sources are arranged in a row in the vertical direction, it is possible to display an image at a low modulation frequency, as compared with a case in which a single laser light component is scanned. In this case, however, a large gap occurs between traces of a group of spots in the region to be irradiated. As the number of laser light sources is increased, the gap becomes larger. Further, scanning in the horizontal direction is misaligned from the horizontal direction of the screen to be inclined. If the gap between scanning traces of the laser light components is conspicuous, it is difficult to obtain high-quality images. As a unit for scanning laser light so as not to cause the conspicuous gap, as many light sources as scanning lines may be arranged in one of the horizontal and vertical directions, and the laser light components may be individually scanned in only one direction. A technology which uses as many light sources as scanning lines has been suggested, for example, in JP-A-2003-21804.

However, when as many light sources as scanning lines are arranged, a great number of light sources need to be provided, and thus the optical scanning device comes expensive. Further, when a difference in intensity exists between the laser light components arranged in a row in the vertical direction or when a gap exists between the laser light components arranged in a row in the vertical direction, brightness irregularity occurs in images. When the difference in intensity exists between the laser light components, a light source unit may be adjusted in advance so as to supply the laser light components having the same intensity. In this case, an output of another laser light component is added to a laser light component having the minimum intensity, and thus brightness of laser light or grayscale level to be originally supplied is wasted. Further, when the gap exists between the laser light components, the laser light components may be moved and scanned so as to simply bury the gap or the laser light components may be arranged in a two-dimensionally direction in advance so as to bury the gap. In this case, brightness irregularity occurs between a region where the laser light components overlap and a region where the laser light components do not overlap. As such, in the related art, when scanning is shared by using a plurality of laser light components, it is difficult to display high-quality images.

SUMMARY

An advantage of some aspects of the invention is that it provides an optical scanning device which causes scanning to be shared by using a plurality of light beams so as to display high-quality images, a method of controlling an optical scanning device, and an image display apparatus having such an optical scanning device.

According to a first aspect of the invention, an optical scanning device, which scans a plurality of color light components so as to display an image, includes a light source unit that supplies a plurality of light beams, and a scanning unit that repeatedly scans each light beam from the light source unit in a first direction and a second direction in a region to be irradiated. The scanning unit is driven such that a frequency for scanning the light beam in the first direction becomes higher than a frequency for scanning the light beam in the second direction, and such that different light beams of the same color light component are allocated to at least some pixels of the image whenever the light beam is scanned in the second direction in the region to be irradiated.

Scanning of the light beam in the second direction is performed on one frame of the image once or multiple times. Whenever the light beam is scanned in the second direction, different light beams of the same color light component are allocated so as to form a pixel, and thus a difference in intensity of the light beams can be averaged as time passes. Further, when a gap exists between laser light components, the region to be irradiated of the light beam can be averaged as time passes, and thus the gap of the region to be irradiated can be buried. Since the difference in intensity of the laser light components or the region to be irradiated can be averaged as time passes, brightness irregularity can be reduced, as compared with the related art in which the same light beam is constantly allocated to each pixel. In addition, scanning is shared by using the plurality of light beams for each color light component, and thus the image can be displayed at a low modulation frequency, as compared with a case in which a single light beam is scanning for each color light component. Accordingly, an optical scanning device which causes scanning to be shared by using the plurality of light beams so as to display high-quality images can be obtained. When the region to be irradiated of the light beam can be averaged, a boundary between pixels is not conspicuous, and thus natural images can also be displayed.

In the optical scanning device according to the first aspect of the invention, it is preferable that the light source unit supply the light beams according to image signals converted such that different light beams of the same color light component are allocated to the pixels. According to this configuration, accurate images according to image signals can be displayed.

In the optical scanning device according to the first aspect of the invention, it is preferable that the light source unit be configured such that spots of the light beams in the region to be irradiated are arranged in the second direction in a row. According to this configuration, scanning can be shared by using the plurality of light beams.

In the optical scanning device according to the first aspect of the invention, it is preferable that the first direction and the second direction be substantially perpendicular to each other, and the scanning unit be driven such that a position in the second direction for starting scanning of the light beam in the first direction is shifted whenever the light beam is scanned in the second direction in the region to be irradiated. According to this configuration, whenever the light beam is scanned in the second direction, different light beams can be allocated to the individual pixels.

In the optical scanning device according to the first aspect of the invention, it is preferable that the scanning unit shift the position in the second direction for starting scanning of the light beam in the first direction in a unit of a length substantially equal to a pixel pitch. According to this configuration, the difference in intensity of the light beam and the region to be irradiated of the light beam can be averaged.

In the optical scanning device according to the first aspect of the invention, it is preferable that the scanning unit shift the position in the second direction for starting scanning of the light beam in the first direction in a unit of a length smaller than a pixel pitch. According to this configuration, the difference in intensity of the light beam and the region to be irradiated of the light beam can be averaged.

In the optical scanning device according to the first aspect of the invention, it is preferable that the scanning unit be driven such that an angle of the first direction with respect to the second direction is changed whenever the light beam is scanned in the second direction in the region to be irradiated. According to this configuration, the different in intensity of the light beam can be averaged, and the gap of the region to be irradiated can be buried.

In the optical scanning device according to the first aspect of the invention, it is preferable that the scanning unit change an angle of the first direction with respect to the second direction in a predetermined angle range while the light beam is scanned in the second direction in the region to be irradiated a predetermined number of times. According to this configuration, the difference in intensity of the light beam and the region to be irradiated of the light beam can be further averaged.

The optical scanning device according to the first aspect of the invention may further include a scanning position detecting unit that detects a position of the light beam in the region to be irradiated. According to this configuration, by using an output from the scanning position detecting unit, a feedback control of the scanning unit can be performed. Therefore, the scanning unit can be accurately driven.

In the optical scanning device according to the first aspect of the invention, it is preferable that, when the light beam is incident on a position covering a plurality of pixels, the light source unit modulate the light beam so as to express a weighted grayscale level by using a ratio of a region overlapping the pixels of a spot formed in the region to be irradiated by the light beam. According to this configuration, a grayscale level at the boundary between the pixels can be accurately expressed, and thus an accurate image can be displayed.

According to a second aspect of the invention, a method of controlling an optical scanning device, which scans a plurality of color light components so as to display an image, includes supplying a plurality of light beams, and repeatedly scanning each light beam in a first direction and a second direction in a region to be irradiated. In the scanning, a frequency for scanning the light beam in the first direction is higher than a frequency for scanning the light beam in the second direction. Further, whenever the light beam is scanned in the second direction in the region to be irradiated, different light beams of the same color light component are scanned to at least some pixels of the image.

According to the method of controlling an optical scanning device, the difference in intensity of the laser light components or the region to be irradiated can be averaged as time passes, and thus brightness irregularity can be reduced, as compared with the related art in which the same light beam is constantly allocated to each pixel. Further, since scanning is shared by using the plurality of light beams for each color light component, the image can be displayed at a low modulation frequency, as compared with the case in which a single light beam is scanned for each color light component. Accordingly, scanning can be shared by using the plurality of light beams, and thus high-quality images can be displayed. When the region to be irradiated of the light beam can be averaged, the boundary between the pixels is not conspicuous, and thus natural images can also be displayed.

According to a third aspect of the invention, there is provided an image display apparatus which displays an image by light from an optical scanning device. Here, the optical scanning device is the above-described optical scanning device. By using the above-described optical scanning device, scanning can be shared by using the plurality of light beams, and thus high-quality images can be displayed. Accordingly, an image display apparatus which causes scanning to be shared by using the plurality of light beams so as to display high-quality images can be obtained.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described in detail.

First Embodiment

Figure 1:
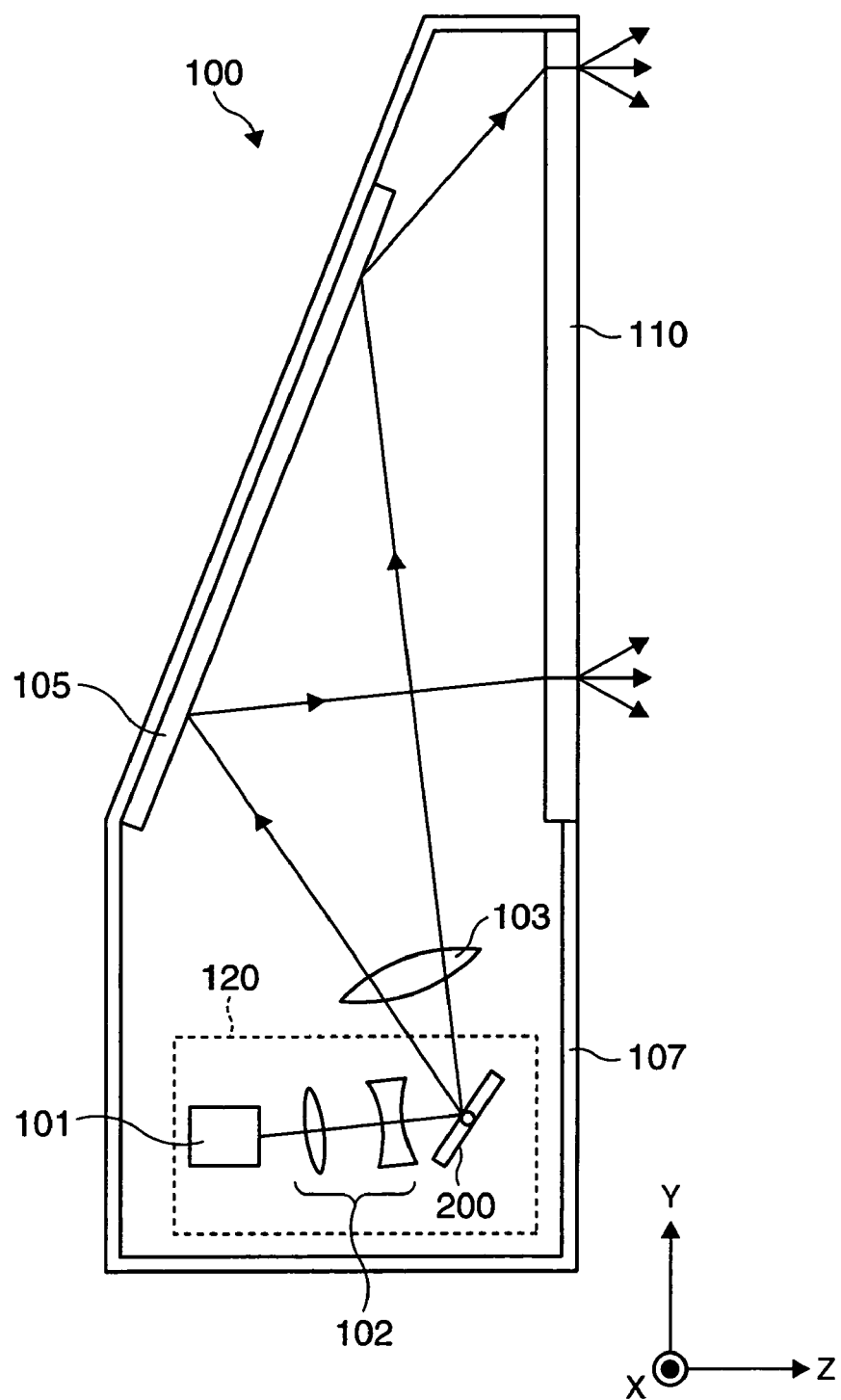
FIG. 1 is a diagram showing a schematic configuration of an image display apparatus according to a first embodiment of the invention.

FIG. 1 shows the schematic configuration of an image display apparatus 100 according to a first embodiment of the invention. The image display apparatus 100 is a so-called projector which shows images by supplying laser light to one surface of a screen 110 and observing light emitted from the other surface of the screen 110. An optical scanning device 120 provided in the image display apparatus 100 scans laser light by using a scanning unit 200. The optical scanning device 120 has a laser device 101, an illumination optical system 102, and the scanning unit 200. The image display apparatus 100 scans a plurality of color light components from the optical scanning device 120 so as to display images.

Figure 2:
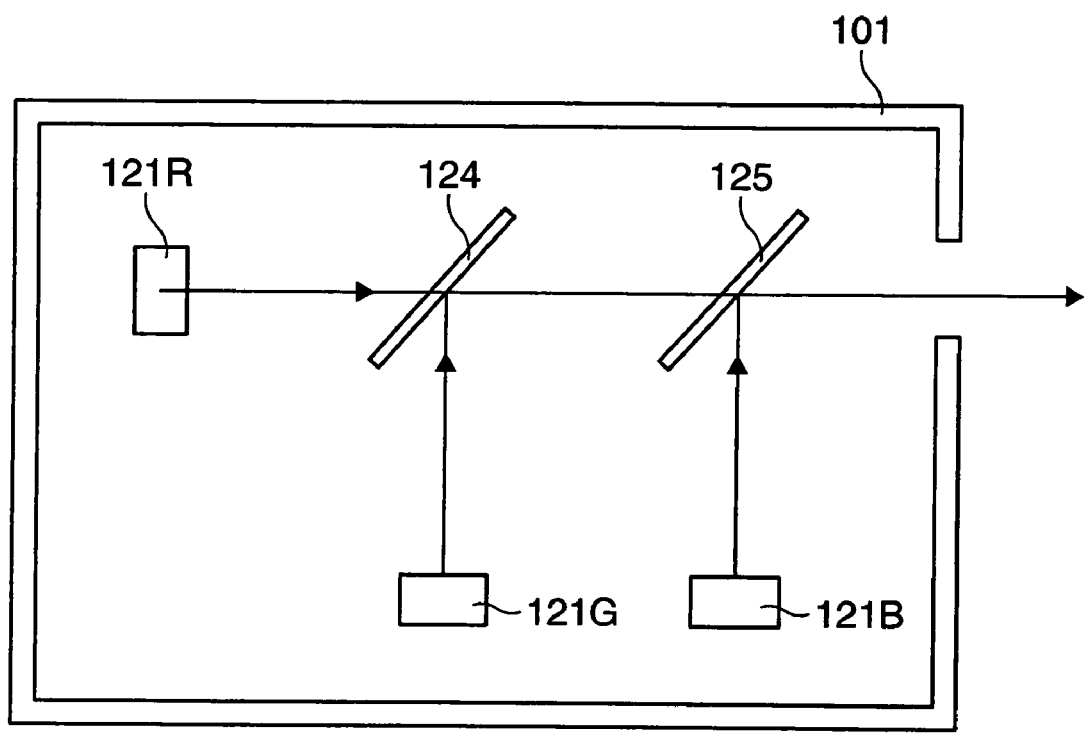
FIG. 2 is a diagram showing a schematic configuration of a laser device.

FIG. 2 shows the schematic configuration of the laser device 101. The laser device 101 has an R light source unit 121R that supplies red laser light (hereinafter, referred to as 'R light component') as a light beam, a G light source unit 121G that supplies green laser light (hereinafter, referred to as 'G light component') as a light beam, and a B light source unit 121B that supplies blue laser light (hereinafter, referred to as 'B light component') as a light beam. All of the R light source unit 121R, the G light source unit 121G, and the B light source unit 121B supply laser light as a plurality of light beams.

The light source units 121R, 121G, and 121B for the respective color light components supply laser light as the plurality of light beams modulated according to image signals. As for modulation according to the image signals, amplitude modulation or pulse width modulation may be used. In the laser device 101, two dichroic mirrors 124 and 125 are provided. The dichroic mirror 124 transmits the R light component and reflects the G light component. The dichroic mirror 125 transmits the R and G light components and reflects the B light components. The R light component from the R light source unit 121R passes through the dichroic mirrors 124 and 125 and is emitted from the laser device 101.

The G light component from the G light source unit 121G is reflected by the dichroic mirror 124, such that the optical path thereof is bent by about 90 degrees. The G light component reflected by the dichroic mirror 124 passes through the dichroic mirror 125 and is emitted from the laser device 101. The B light component from the B light source unit 121B is reflected by the dichroic mirror 125, such that the optical path thereof is bent by about 90 degrees. The B light component reflected by the dichroic mirror 125 is emitted from the laser device 101. By doing so, the laser device 101 supplies the R, G, and B light components modulated according to the image signals. Returning to FIG. 1, laser light from the laser device 101 passes through the illumination optical system 102 and then is incident on the scanning unit 200. Light from the scanning unit 200 passes through a projection optical system 103, and then is incident on a reflecting unit 105. The illumination optical system 102 and the projection optical system 103 cause laser light from the laser device 101 to be imaged on the screen 110.

The reflecting unit 105 reflects laser light from the scanning unit 200 toward the screen 110. A case 107 keeps an inner space of the case 107 airtight. The screen 110 is provided on one predetermined surface of the case 107. The screen 110 is a transmissive screen that transmits laser light modulated according to the image signals. Light from the reflecting unit 105 is incident from a surface of the screen 110 inside the case 107, and then is emitted from a surface of screen 110 on an observer side. An observer observes light emitted from the screen 110 so as to view the images.

Figure 3:
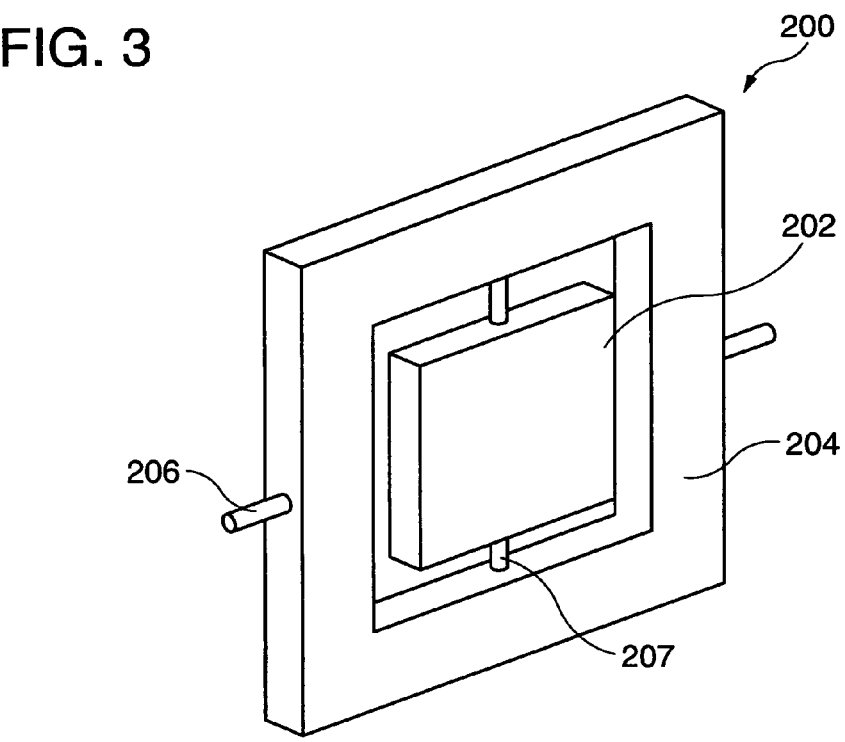
FIG. 3 is a diagram showing a schematic configuration of a scanning unit.

FIG. 3 shows the schematic configuration of the scanning unit 200. The scanning unit 200 has a reflecting mirror 202, and an outer frame 204 provided in the periphery of the reflecting mirror 202. That is, the scanning unit 200 has a so-called double-gimbal structure. The outer frame 204 is connected to fixed portions (not shown) by torsion springs 206 serving as a rotational shaft. The outer frame 204 rotates around the torsion springs 206 by using the twist and the restoration to original states of the torsion springs 206. The reflecting mirror 202 is connected to the outer frame 204 by torsion springs 207 serving as a rotational shaft substantially perpendicular to the torsion springs 206. The reflecting mirror 202 reflects laser light from the laser device 101. The reflecting mirror 202 can be formed of a member having high reflectivity, for example, a metal thin film of aluminum or silver.

When the outer frame 204 rotates around the torsion springs 206, the reflecting mirror 202 is displaced so as to scan laser light in the Y direction (see FIG. 1) in the screen 110. Further, the reflecting mirror 202 rotates around the torsion springs 207 by using the twist and the restoration to original states of the torsion springs 207. The reflecting mirror 202 rotates around the torsion springs 207 and is displaced so as to scan laser light reflected by the reflecting mirror 202 in the X direction. As such, the scanning unit 200 causes laser light from the laser device 101 to be repeatedly scanned in the X and Y directions.

Figure 4:
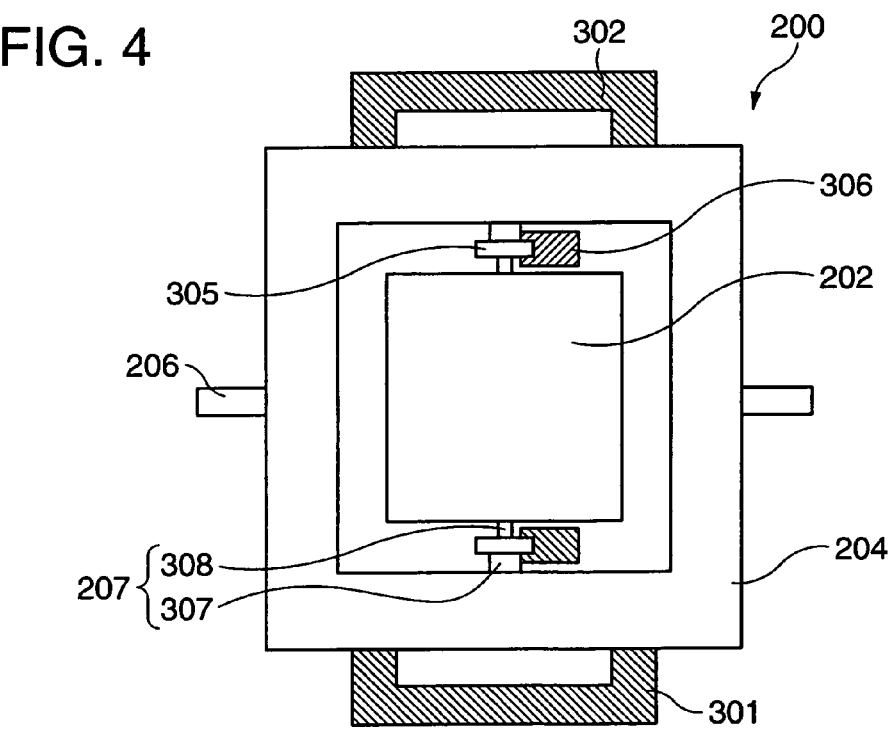
FIG. 4 is a diagram illustrating a configuration for driving the scanning unit.

FIG. 4 illustrates the configuration for driving the scanning unit 200. If the side of the reflecting mirror 202 reflecting laser light is referred to as the front side, first electrodes 301 and 302 are provided at substantially symmetric positions with respect to the torsion springs 206 in a space of the back side of the outer frame 204. When a voltage is applied to the first electrodes 301 and 302, predetermined force according to a potential difference, for example, electrostatic force, is generated between the first electrodes 301 and 302 and the outer frame 204. The outer frame 204 rotates around the torsion springs 206 by alternately applying the voltage to the first electrodes 301 and 302.

Specifically, each torsion spring 207 has a first torsion spring 307 and a second torsion spring 308. Between the first torsion spring 307 and the second torsion spring 308, a mirror-side electrode 305 is provided. In a space of the back side of the mirror-side electrode 305, a second electrode 306 is provided. When a voltage is applied to the second electrode 306, predetermined force according to a potential difference, for example, electrostatic force, is generated between the second electrode 306 and the mirror-side electrode 305. If a voltage having the same phase is applied to any second electrode 306, the reflecting mirror 202 rotates around the torsion springs 207. The scanning unit 200 causes laser light to be scanned in a two-dimensional direction by rotating the reflecting mirror 202 in such a manner. The scanning unit 200 can be created, for example, by a MEMS (Micro Electro Mechanical Systems) technology.

The scanning unit 200 causes the reflecting mirror 202 to be displaced such that laser light is reciprocated multiple times in the horizontal direction, that is, in the X direction, while laser light is scanned once in the vertical direction, that is, in the Y direction, for example, in one frame period of the image. When the X direction is a first direction, and the Y direction is a second direction substantially perpendicular to the first direction, the scanning unit 200 is driven such that a frequency for scanning laser light in the first direction becomes higher than a frequency for scanning laser light in the second direction. Moreover, in order to perform scanning of laser light in the X direction at high speed, it is preferable that the scanning unit 200 causes the reflecting mirror 202 to resonate around the torsion springs 207. By causing the reflecting mirror 202 to resonate, a displacement of the reflecting mirror 202 can be increased. By increasing the displacement of the reflecting mirror 202, the scanning unit 200 can efficiently scan laser light with small energy. Moreover, the reflecting mirror 202 can be driven without using the resonance.

Moreover, the scanning unit 200 is not limited to the configuration which is driven by electrostatic force according to the potential difference. For example, a configuration which is driven by using expansion and contraction force or electromagnetic force of a piezoelectric element may be used. The scanning unit 200 may have a configuration in which a reflecting mirror for scanning laser light in the X direction and a reflecting mirror for scanning laser light in the Y direction are provided. In addition, the scanning unit 200 is not limited to a configuration which uses a galvano mirror. For example, a polygon mirror which rotates a rotating body having a plurality of mirror pieces may be used.

Figure 5:
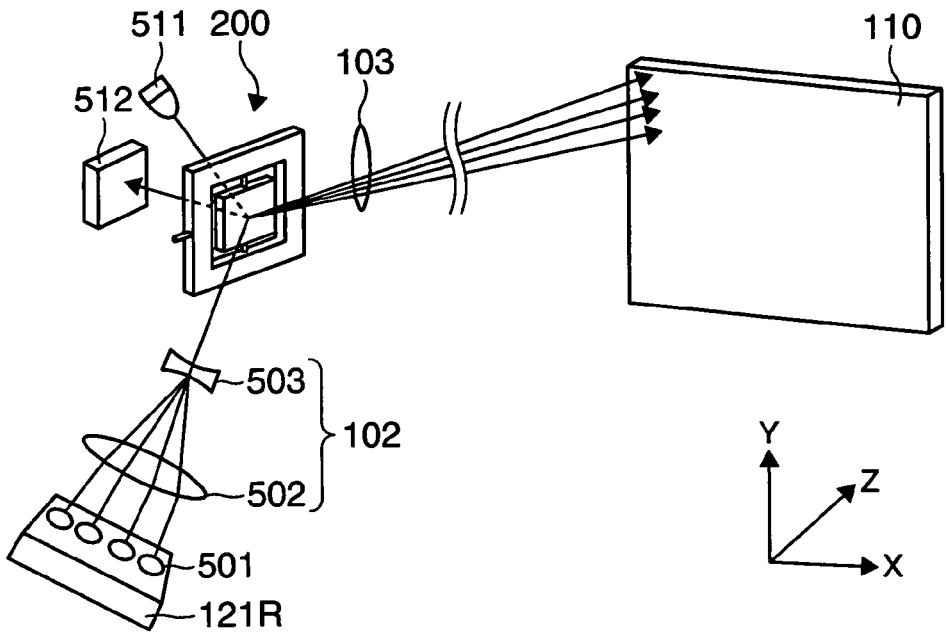
FIG. 5 is a diagram showing an optical path of laser light.

FIG. 5 illustrates an optical path of laser light from the R light source unit 121R. In this embodiment and the embodiments described below, a configuration which supplies laser light from the R light source unit 121R of the light source units for the respective color light components will be described as a representative example. Further, parts unnecessary for the description have been omitted from the drawings. The R light source unit 121R has four openings 501. The respective openings 501 supply laser light independently modulated.

The illumination optical system 102 provided between the R light source unit 121R and the scanning unit 200 can be configured by the combination of a convex lens 502 and a concave lens 503. The illumination optical system 102 causes laser light from the R light source unit 121R to be emitted at the substantially same interval as the pixel pitch by convergence of the convex lens 502 and divergence of the concave lens 503. The projection optical system 103 between the scanning unit 200 and the screen 110 causes laser light from the R light source unit 121R to be imaged on the screen 110. By using the illumination optical system 102 and the projection optical system 103, high-definition images can be displayed on the screen 110.

Figure 6:
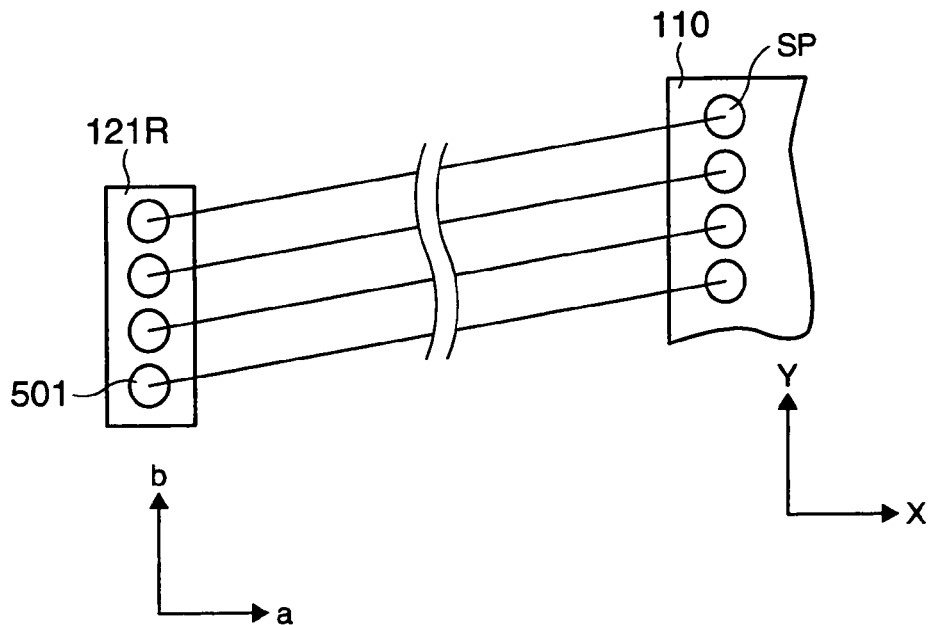
FIG. 6 is a diagram illustrating the arrangement of openings in an R light source unit.

FIG. 6 illustrates the arrangement of the openings 501 in the R light source unit 121R. When an a direction on the R light source unit 121R and a b direction substantially perpendicular to the a direction correspond to the X direction and the Y direction on the screen 110, the four openings 501 are arranged in the b direction. By laser light from the individual openings 501, four spots SP are arranged in a row in the Y direction on the screen 110. The light source unit is configured such that the spots SP of laser light are arranged in a row in the second direction, that is, the Y direction, in the screen 110 serving as the region to be irradiated.

Returning to FIG. 5, in the periphery of the scanning unit 200, a detection light source unit 511 and a scanning position detecting unit 512 are provided. The detection light source unit 511 and the scanning position detecting unit 512 are provided on a side opposite to the side on which laser light from the R light source unit 121R is reflected by the scanning unit 200. The scanning position detecting unit 512 detects the displacement of the scanning unit 200 in the two-dimensional direction by detection light from the detection light source unit 511 reflected by the reflecting mirror 202 (see FIG. 3) of the scanning unit 200. By the output from the scanning position detecting unit 512, the position of laser light in the screen 110 can be detected. Moreover, in at least a part of the reflecting mirror 202 where detection light is incident, like the surface, a high-reflective member may be formed. When detection light is reflected by the high-reflective member, a signal having a high S/N ratio can be obtained in the scanning position detecting unit 512. The detection light source unit 511 and the scanning position detecting unit 512 may be provided in a space on the side where laser light from the R light source unit 121R is reflected by the scanning unit 200.

Figure 7:
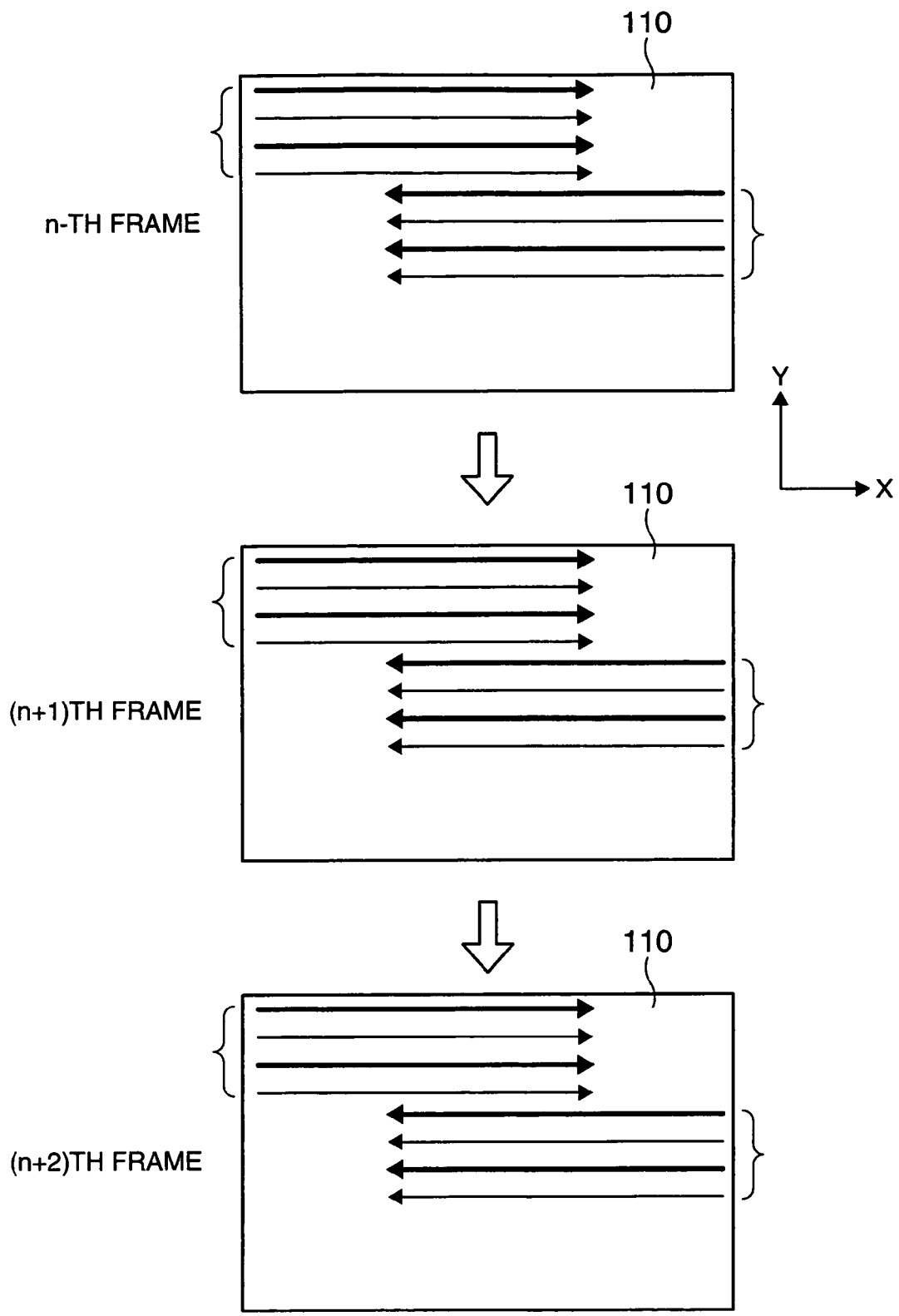
FIG. 7 is a diagram illustrating scanning of laser light by an optical scanning device according to the related art.

FIG. 7 illustrates scanning of laser light by an optical scanning device according to the related art as the comparative example of this embodiment. In FIG. 7, an upper direction is a plus Y direction and a right direction is a plus x direction. In an arbitrary n-th frame, scanning of four laser light components from the R light source unit 121R starts from an upper left portion of the screen 110 as viewed from the incident side of the screen 110. By causing the four laser light components to be scanned once in the right direction, the pixels from the first row to the fourth row of the n-th frame are formed. Next, by causing the four laser light components to be scanned in the left direction after the scanning position has been moved downward, the pixels from the fifth row to the eighth row of the n-th frame are formed. By repeating these operations, the image of the n-th frame is formed.

As for the (n+1)th frame and the (n+2)th frame, like the n-th frame, four laser light components are scanned. When the optical scanning device according to the related art is used, the same laser light components are constantly allocated to the pixels in each frame. When a difference in intensity of the laser light components occurs, as time passes, brightness irregularity for each line where laser light is scanned drastically appears. In order to reduce brightness irregularity, the light source unit may be adjusted such that the laser light components have the same intensity. In this case, the output of another laser light component is added to a laser light component having the minimum intensity, and thus brightness of laser light or grayscale level to be originally supplied is wasted. Moreover, in FIG. 7, a difference in size of arrows representing scanning traces of the laser light components indicates a difference in intensity of the laser light components.

Figure 8:
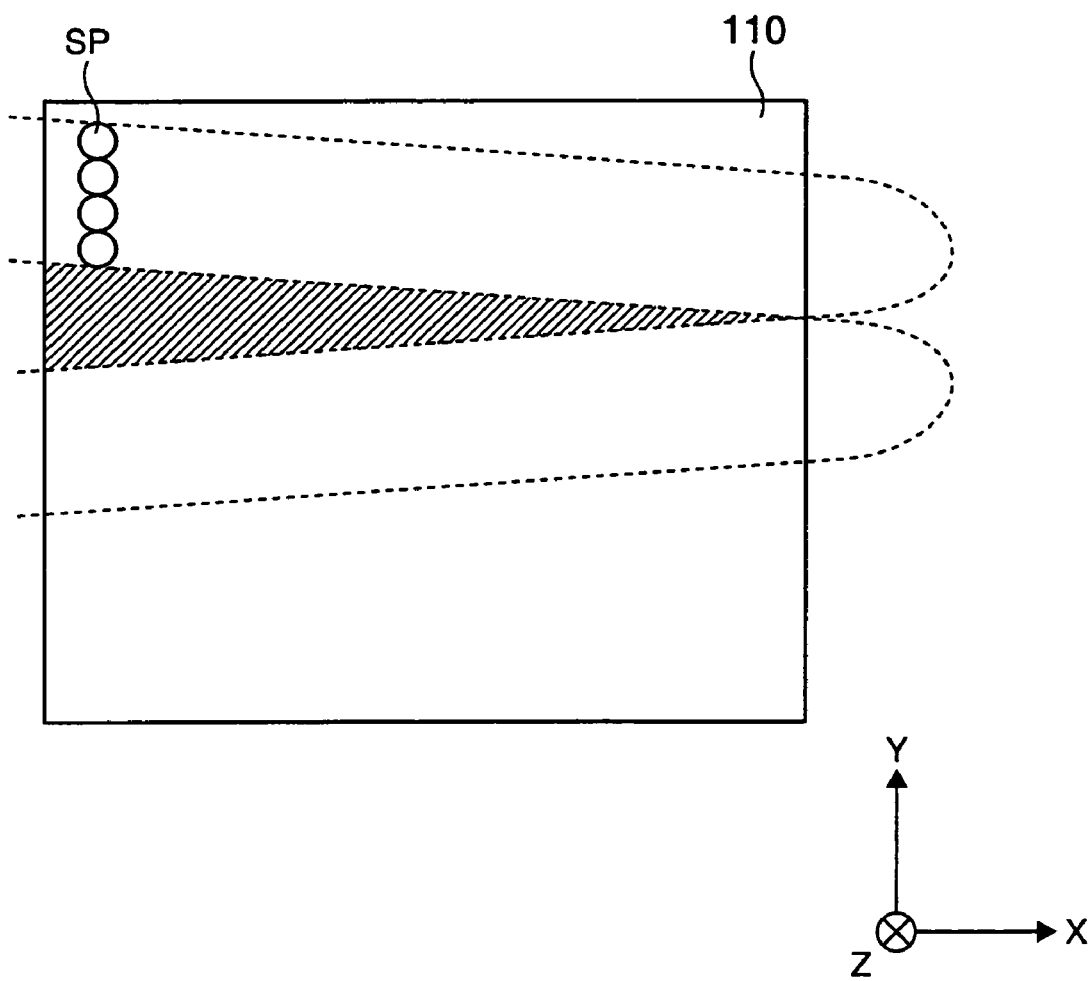
FIG. 8 is a diagram illustrating scanning of laser light by an optical scanning device according to the related art.

FIG. 8 illustrates another inconsistency in the optical scanning device according to the related art. As shown in FIG. 8, when laser light is scanned, the time for causing the four laser light components to be scanned once in the X direction corresponds to the time for causing a single laser light component to be reciprocated in the X direction two times. For this reason, by arranging the four spots SP in a row in the Y direction, the image can be displayed at a low modulation frequency, as compared with the case in which the single laser light component is used. On the other hand, when scanning of laser light in the X direction is delayed, while laser light is scanned once in the X direction, the movement amount of laser light in the Y direction is increased. In the optical scanning device according to the related art, in each frame, each laser light component is constantly scanned on the same trace. By constantly scanning each laser light component on the same trace, as indicated by a hatched region in FIG. 8, as time passes, a dark portion is generated between the traces of a group of spots SP.

Figure 9:
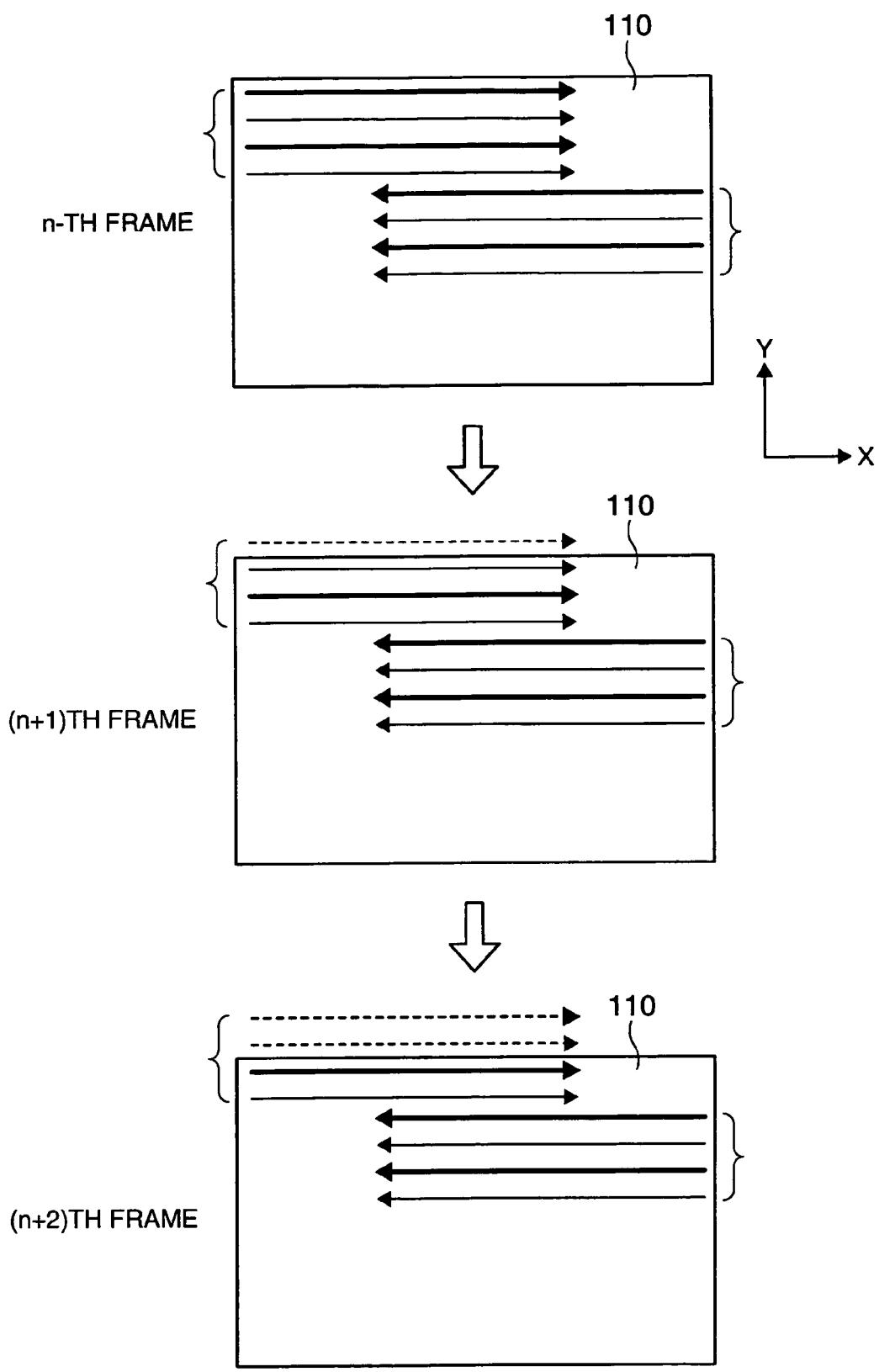
FIG. 9 is a diagram illustrating scanning of laser light by an optical scanning device.

FIG. 9 illustrates scanning of laser light by the optical scanning device 120 according to this embodiment. In the n-th frame, like the optical scanning device according to the related art shown in FIG. 7, the individual laser light components are scanned. Next, in the (n+1)th frame, scanning of laser light starts from positions where the four laser light components are shifted upward by one pixel from the positions when the image of the n-th frame is displayed. In the (n+2)th frame, scanning of laser light starts from positions where the four laser light components are further shifted upward by one pixel from the positions where the image of the (n+1)th frame is displayed. The scanning unit 200 is driven such that the position of the Y direction starting scanning of laser light in the first direction, that is, the X direction, is shifted whenever laser light is scanned in the second direction, that is, the Y direction, in the screen 110 serving as the region to be irradiated.

Figure 10:
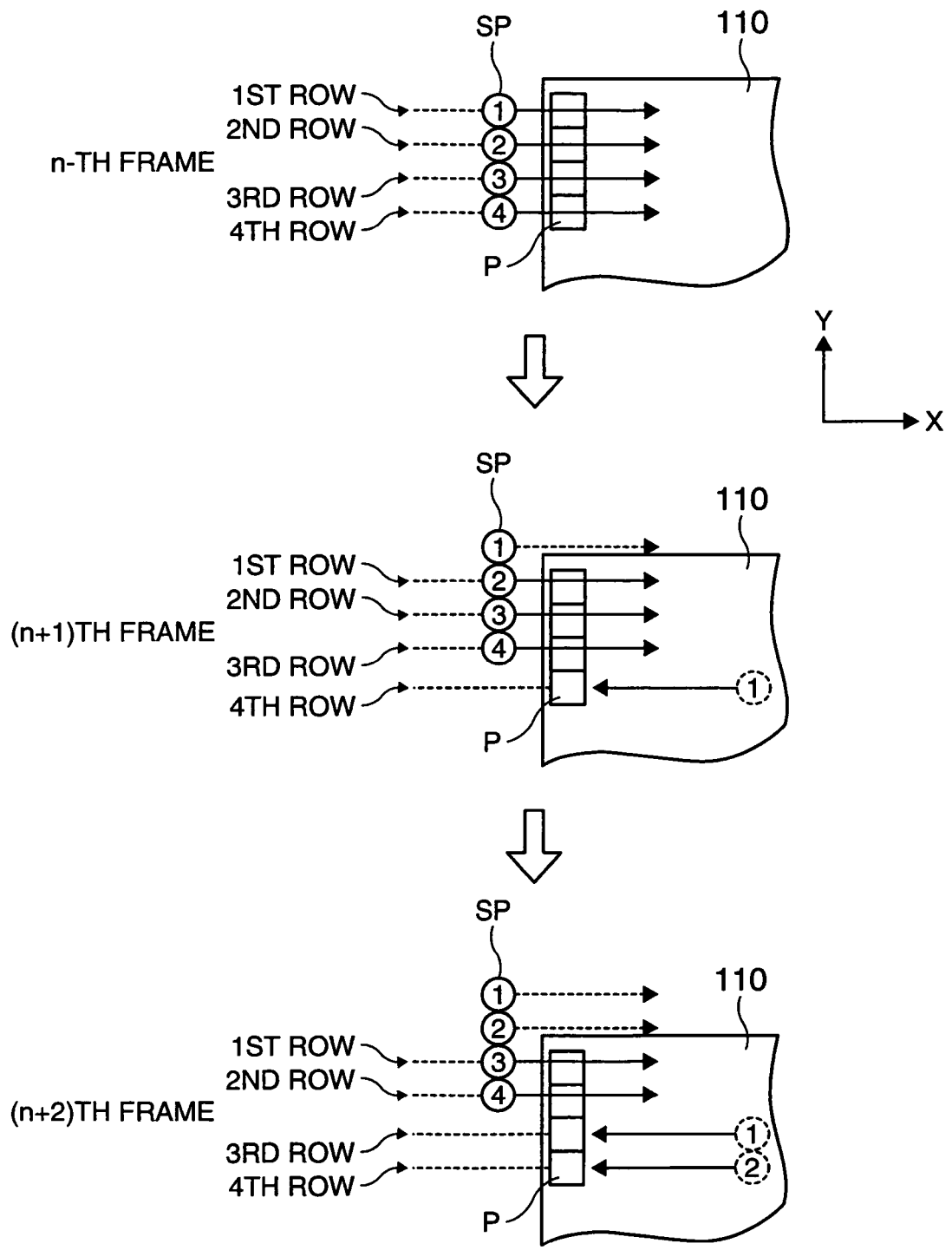
FIG. 10 is a diagram illustrating a shift of laser light in a Y direction.

FIG. 10 illustrates the shift of laser light in the second direction, that is, the Y direction. Here, the description will be given by attaching the numerals of 1 to 4 to the four spots SP appearing on the screen 110. In the n-th frame, the spots SP1, SP2, SP3, and SP4 are individually allocated to the pixels P of the first row to the fourth row. In the next (n+1)th frame, the individual spots SP are shifted upward by one pixel, and the spots SP2, SP3, and SP4 are individually allocated to the pixels P of the first to third rows. While the spots SP2, SP3, and SP4 individually move on the pixels P of the first to third rows, and thus the spot SP1 scans outside the screen 110, the supply of laser light for forming the spot SP1 stops. To the pixel P of the fourth row, the spot SP1, which moves in the left direction, is allocated.

In addition, in the next (n+2)th frame, the spots SP are further shifted upward by one pixel, and the spots SP3 and SP4 are allocated to the pixels P of the first and second rows. While the spots SP3 and SP4 individually move on the pixels P of the first and second rows, the spots SP1 and SP2 scan outside the screen 110, and thus the supply of laser light for forming the spots SP1 and SP2 stops. To the pixels P of the third and fourth rows, the spots SP1 and SP2, which move in the left direction, are individually allocated. As such, in this embodiment, whenever laser light is scanned in the second direction, that is, the Y direction, in the screen 110 serving as the region to be irradiated, different laser light components of the same color light component are allocated to the individual pixels P. Further, the position of the Y direction starting scanning of laser light in the X direction is shifted in a unit of a length substantially equal to the pitch of the pixel P.

Laser light from the G light source unit 121G and laser light from the B light source unit 121B are also scanned in the same manner as laser light from the R light source unit 121R. Moreover, a mode for shifting the scanning position of laser light is not limited to the description of this embodiment. The invention is not limited to the configuration in which the laser light components are shifted upward by one pixel for each frame. For example, the laser light components may be shifted downward by one pixel. Further, the invention is not limited to the configuration in which the laser light components are constantly shifted by the length substantially equal to the pixel pitch. For example, the laser light components may be simultaneously shifted by two or more times as much as the length of the pixel pitch. In addition, the invention is not limited to the configuration in which the scanning position of laser light is shifted for each frame. When scanning in the Y direction is performed multiple times for one frame, the scanning position of laser light may be shifted for each scanning in the Y direction of one frame. Instead of the configuration in which the scanning position of laser light is shifted for each scanning in the Y direction, the scanning position of laser light may be shifted for scanning in the Y direction two times or more.

In the optical scanning device 120 according to the invention, scanning is shared by using a plurality of laser light components for each color light component, and thus the image can be displayed at a low modulation frequency, as compared with the case in which the single laser light component is scanned for each color light component. Further, whenever laser light is scanned in the Y direction, different laser light components of the same color light component are allocated to the individual pixels, and thus the difference in intensity of laser light can be averaged as time passes. Further, by moving the scanning position of laser light, the gap between the scanning traces can be buried. Since the difference in intensity of laser light can be averaged as time passes, and the gap between the scanning traces can be buried, brightness irregularity can be reduced, as compared with a case in which the optical scanning device according to the related art for constantly allocating the same laser light components to the individual pixels P is used. Accordingly, scanning can be shared by using a plurality of light beams, and high-quality images can be displayed.

Figure 11:
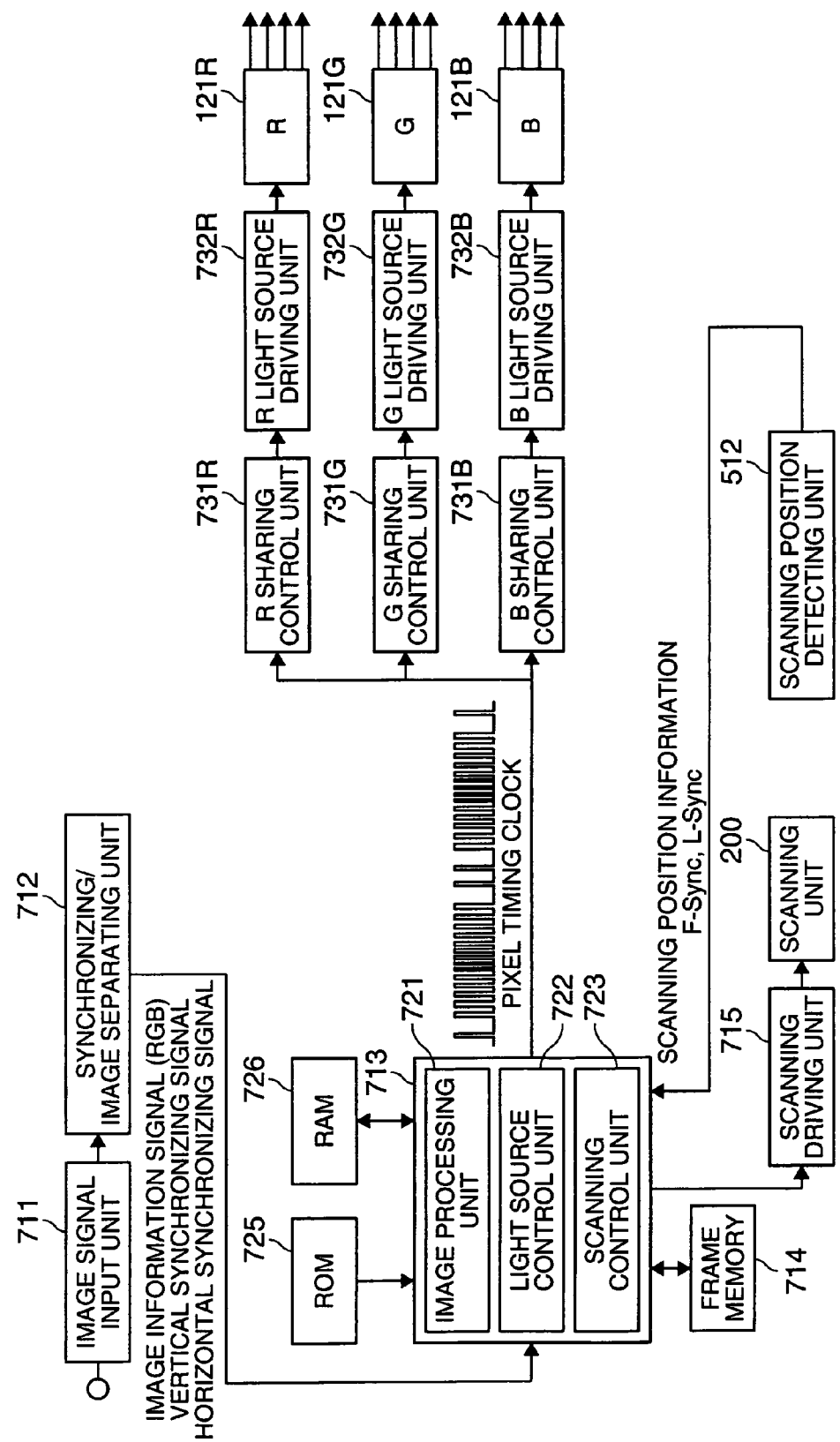
FIG. 11 is a diagram illustrating a configuration for controlling an optical scanning device.

FIG. 11 illustrates the configuration for controlling the optical scanning device 120. An image signal input unit 711 corrects characteristics of an image signal input from an input terminal or amplifies the image signal. Further, the image signal input unit 711 converts an analog image signal into a digital pulse signal for light-source modulation, for example. A synchronizing/image separating unit 712 separates the signal from the image signal input unit 711 into image information signals, vertical synchronizing signals, and horizontal synchronizing signals for the R, G, and B light components and outputs them to a control unit 713. The control unit 713 divides the image information into information for each frame and output the information to a frame memory 714.

The control unit 713 refers to information of a ROM 725 and a RAM 726, and controls the light source units for the respective color light components and the scanning unit 200. In the ROM 725, data of the minimum and maximum values of the shift amount for shifting the scanning position of laser light in the Y direction, and a shift cycle are stored. The shift cycle is the time for changing the typical shift amount between the minimum value and the maximum value. In this embodiment, as a pattern in which laser light is scanned, in addition to three patterns shown in FIG. 9, a pattern in which the spot SP4 is allocated to the pixel of the first row can be used. When the four laser light components are scanned for each color light component, the laser light components are scanned by the four patterns, and thus the four laser light components can be allocated to the individual pixels by one time. For this reason, as the shift cycle, the time for four frames can be set. Further, when the four laser light components are individually allocated to the pixels of the first to fourth rows (the pattern of the n-th frame shown in FIG. 9), as for the shift amount, the minimum value can be set to 0 (zero), and the maximum value can be set to the length of three times as much as the pixel pitch.

Figure 12:
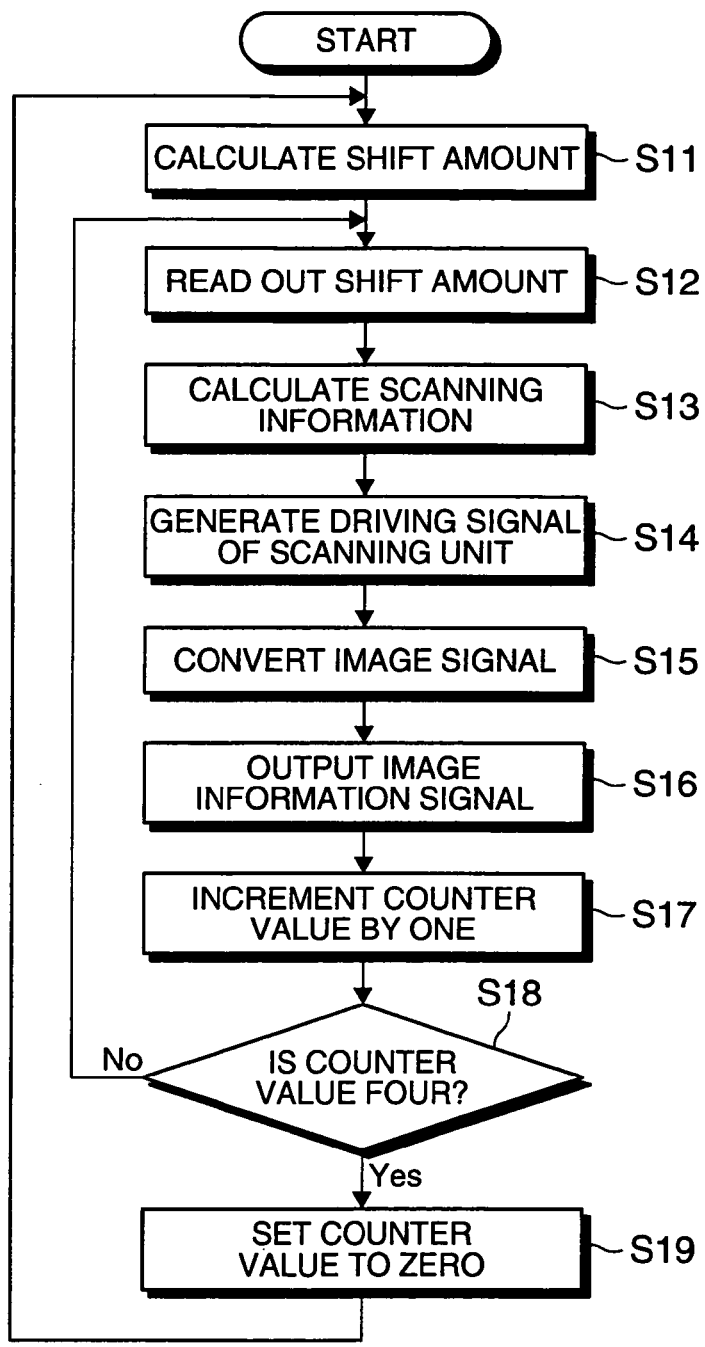
FIG. 12 is a flowchart of a process for controlling light source units for respective color light components and a scanning unit.

FIG. 12 is a flowchart of a process for controlling the light source units for the respective color light components and the scanning unit 200 such that different laser light components are allocated to the individual pixels. When a counter value referred to from the RAM 726 is 0 (zero), at a step S11, the control unit 713 calculates the shift amount corresponding to the counter value, and outputs the calculated shift amount to the RAM 726. The control unit 713 refers to the RAM 725, and generates the shift amount on the counter value (0 to 3), for example, as a random number for each pixel pitch serving as a unit length. In the RAM 726, the counter value of the frame and the shift amount corresponding to the counter value are stored.

Next, at a step S12, the control unit 713 reads out the shift amount (for example, the length of the pixel pitch) corresponding to the counter value 0. At a step S13, an image processing unit 721 calculates a deflection angle of the reflecting mirror 202 when the scanning position of laser light is shifted by the length of the pixel pitch, and scanning information such as the number of scanning times in the X direction in one frame or the like, and outputs them to the RAM 726. At a step S14, a scanning control unit 723 generates a driving signal for driving the scanning unit 200 on the basis of the vertical synchronizing signal, the horizontal synchronizing signal, and the information stored in the RAM 726. A scanning driving unit 715 drives the scanning unit 200 in response to the driving signal from the control unit 713. At a step S15, the image processing unit 721 converts the image signal by using the calculation result of the scanning information, and outputs the converted image signal to the RAM 726. At a step S16, a light source control unit 722 outputs the image information signal for every one frame on the basis of the information stored in the RAM 726.

After outputting the image information signal at the step S16, at a step S17, the control unit 713 increments the counter value by 1 (one). At a step S18, when the counter value is not four, the process returns to the step S12. At the step S18, when the counter value is four, at a step S19, the counter value returns to an initial value 0, and the process returns to the step S11. Moreover, if the scanning position of laser light is shifted from the pattern of the n-th frame shown in FIG. 10, the number of scanning times in the X direction of one frame needs to be increased. In order to increase the number of scanning times of one frame, a scanning speed may be increased without changing the time of one frame or the time of one frame may be lengthened without changing the scanning speed.

Returning to FIG. 11, the scanning position detecting unit 512 detects the position of laser light in the screen 110 and outputs scanning position information to the control unit 713. Further, the scanning position detecting unit 512 detects the deflection angle of the reflecting mirror 202, which causes laser light to be scanned in the X direction, and the deflection angle of the reflecting mirror 202, which causes laser light to be scanning in the Y direction. The scanning position detecting unit 512 generates a frame start signal F_Sync from the deflection angle for causing the reflecting mirror 202 to scan in the Y direction and a line start signal L_Sync from the deflection angle for causing the reflecting mirror 202 to scan in the X direction, and outputs the signals to the control unit 713.

The scanning control unit 723 performs the feedback control of the scanning unit 200 on the basis of the scanning position information from the scanning position detecting unit 512. Accordingly, the scanning unit 200 can be accurately driven. The control unit 713 generates a pixel timing clock on the basis of a flux calculated from the frame start signal F_Sync and the line start signal L_Sync, the horizontal synchronizing signal, and the vertical synchronizing signal. The pixel timing clock is a signal for noticing a timing at which laser light passes through each pixel. The pixel timing clock is intended to cause laser light modulated according to the image signal to be incident at an accurate position.

An R sharing control unit 731R generates driving signals for the four laser light components on the basis of the image information signal input from the control unit 713. An R light source driving unit 732R drives the R light source unit 121R on the basis of the driving signals from the R sharing control unit 731R. A G sharing control unit 731G generates driving signals for the four laser light components on the basis of the image information signal input from the control unit 713. A G light source driving unit 732G drives the G light source unit 121G on the basis of the driving signals from the G sharing control unit 731G. A B sharing control unit 731B generates driving signals for the four laser light components on the basis of the image information signal input from the control unit 713. A B light source driving unit 732B drives the B light source unit 121B on the basis of the driving signals from the B sharing control unit 731B. The light source units for the respective color light components supply laser light according to the image signal converted such that different laser light components of the same color light component are allocated to the pixels. According to the image display apparatus 100 according to this embodiment, in such a manner, whenever laser light is scanned in the Y direction in the screen 110, different laser light components of the same color light component are allocated to the individual pixels, thereby displaying the images.

Moreover, the optical scanning device 120 is not limited to the configuration in which the four laser light components are supplied for each color light component, but may have a configuration in which a plurality of laser light components are supplied for each color light component. Further, the invention is not limited to the case in which each color light component is scanned by using one scanning unit 200. For example, different scanning units for the color light components may be used. In this case, the number of laser light components may be different for each color light component. Further, the light source units for the respective color light components are not limited to the configuration having the plurality of openings. For example, a plurality of laser light sources, each of which supplies a single laser light component, may be arranged. In addition, the invention is not limited to the case in which the openings for supplying laser light are arranged in a row in one direction. For example, the openings may be provided in an array in two directions.

The optical scanning device 120 is not limited to the configuration in which the analog image signal is converted into the digital pulse signal for light-source modulation. For example, the image signal input unit 711 may convert a digital image signal into an analog intensity signal for light-source modulation. Further, the image signal input unit 711 may convert a digital image signal into a digital pulse signal for light-source modulation.

Figure 13:
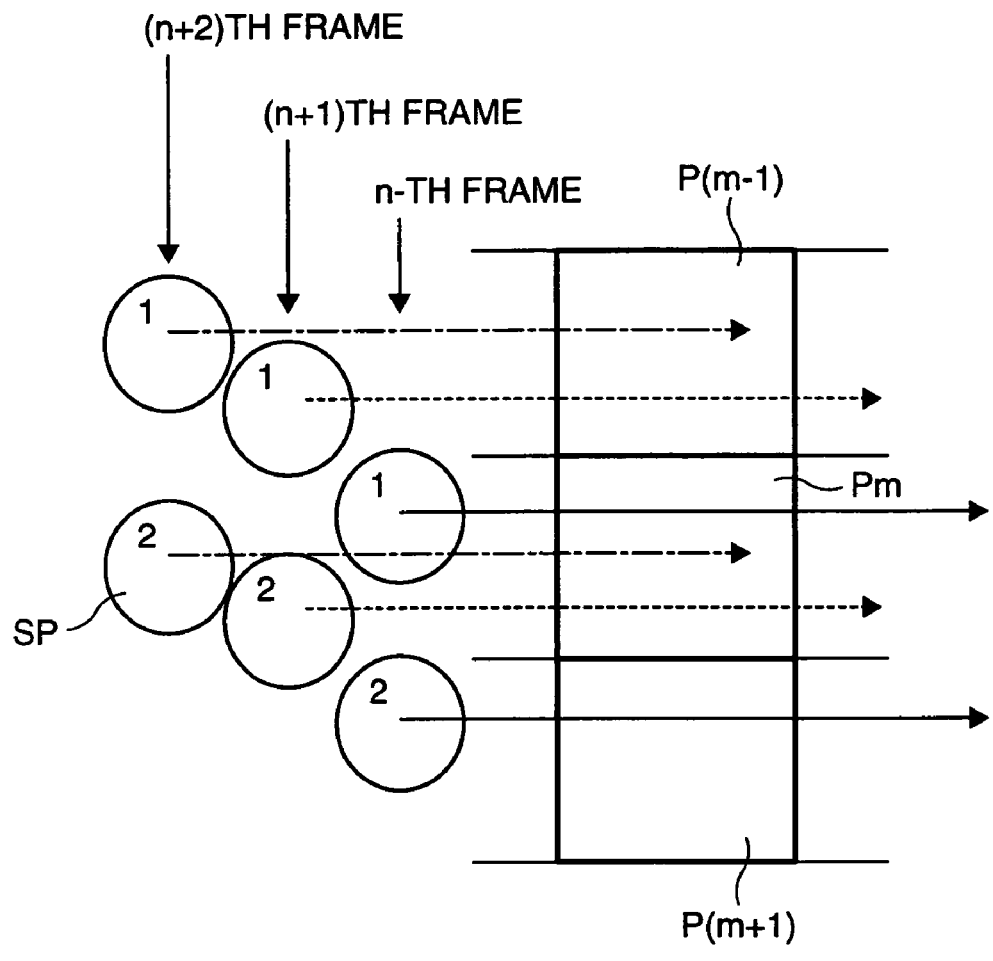
FIG. 13 is a diagram illustrating an optical scanning device according to a modification of the first embodiment of the invention.

FIG. 13 illustrates a mode of scanning laser light by an optical scanning device according to a modification of the above-described embodiment. In the optical scanning device according to this modification, the position of the second direction starting scanning in the first direction is shifted by the scanning unit in a unit of a length smaller than the pixel pitch. Each of the light source units for the respective color light components of this modification is configured such that two spots SP having the substantially same interval as the pixel pitch are arranged in a row in the Y direction. Further, each of the light source units for the respective color light components is adjusted such that all the spots SP1 and SP2 have an area smaller than that of the pixel.

FIG. 13 shows the pixel Pm of three adjacent frames and the scanning positions of laser light at a timing passing through its periphery. In an arbitrary n-th frame, the spots SP1 and SP2 individually pass through the upper side of the pixel Pm and the upper side of the pixel P(m+1). In the next (n+1)th frame, scanning of laser light starts from positions where the two laser light components are shifted upward by about half pixel from the positions when the image of the n-th frame is displayed. By shifting the scanning positions of the laser light components, in the (n+1)th frame, the spots SP1 and SP2 individually pass through the lower side of the pixel P(m+1) and the lower side of the pixel Pm.

In addition, in the next (n+2)th frame, the spots SP1 and SP2 are further shifted upward by half pixel. In the (n+1)th frame, the spots SP1 and SP2 individually pass through the center of the pixel P(m+1) and the center of the pixel Pm. The shift amount of laser light or the shift cycle can be suitably set such that the difference in intensity of laser light can be averaged as time passes.

Figure 14:
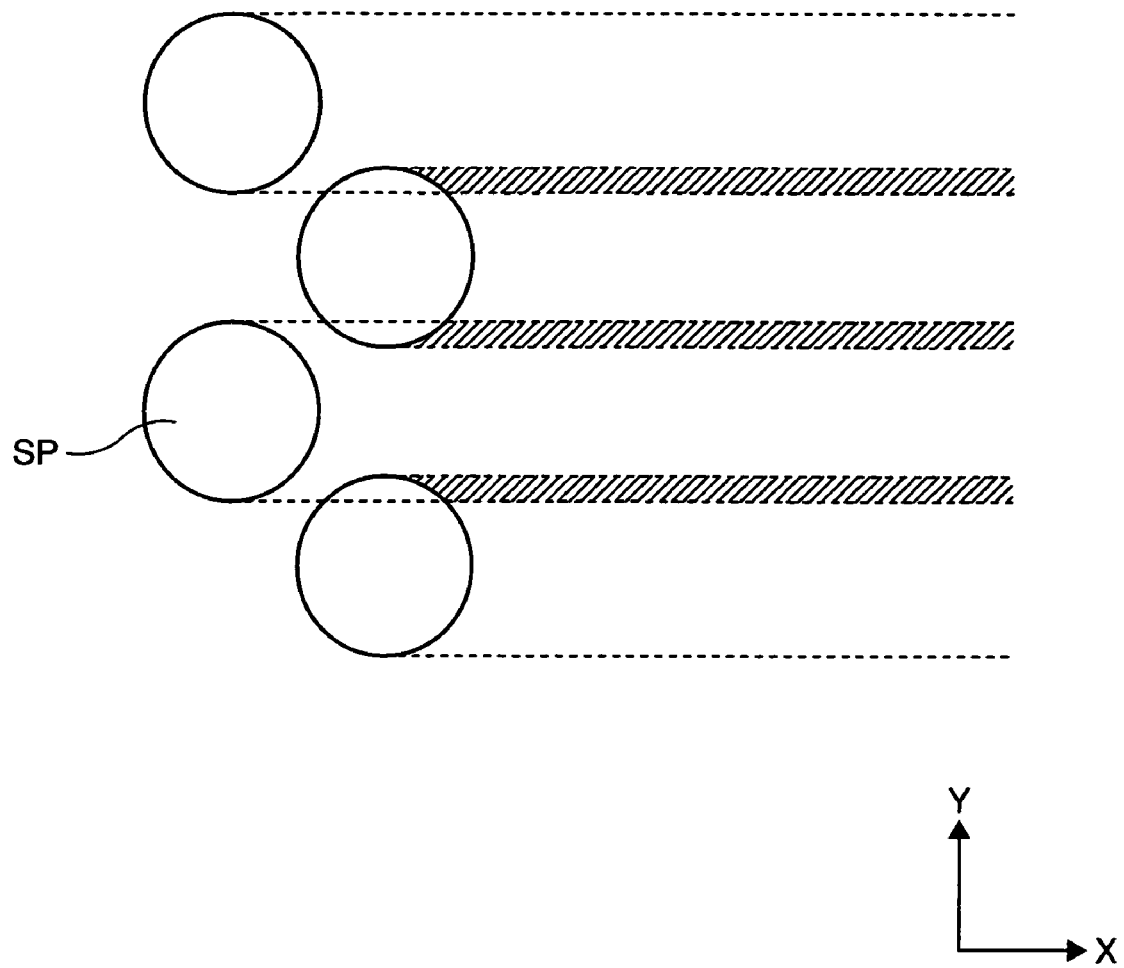
FIG. 14 is a diagram illustrating an inconsistency in the optical scanning device according to the related art.

FIG. 14 illustrates an inconsistency in the optical scanning device according to the related art. In the optical scanning device according to the related art, when a gap exists between the laser light components, the position of laser light may be moved so as to simply bury the gap or the laser light components may be arranged in a row in the two-dimensional direction in advance so as to bury the gap. In this case, brightness irregularity occurs in a hatched region where the laser light components overlap and a voided region where the laser light components do not overlap.

In the modification, whenever laser light is scanned in the Y direction, laser light is shifted, and thus, like the above-described optical scanning device 120, the difference in intensity of laser light can be averaged as time passes. Further, by shifting the position of the Y direction in a unit of the length smaller than the pixel pitch, even when the gap exists between the laser light components, the region to be irradiated of laser light is averaged as time passes. By averaging the region to be irradiated of laser light, the gap of the region to be irradiated can be buried. Accordingly, scanning can be shared by using the plurality of light beams, and high-quality images can be displayed. In addition, by averaging the region to be irradiated of laser light, the boundary between the pixels becomes inconspicuous, and thus natural images can be displayed. Moreover, the invention is not limited to the configuration in which the spot SP of laser light is smaller than the pixel. For example, when the spot SP has the substantially same size as that of the pixel, by averaging the region to be irradiated of laser light, high-quality images can be displayed.

Second Embodiment

Figure 15:
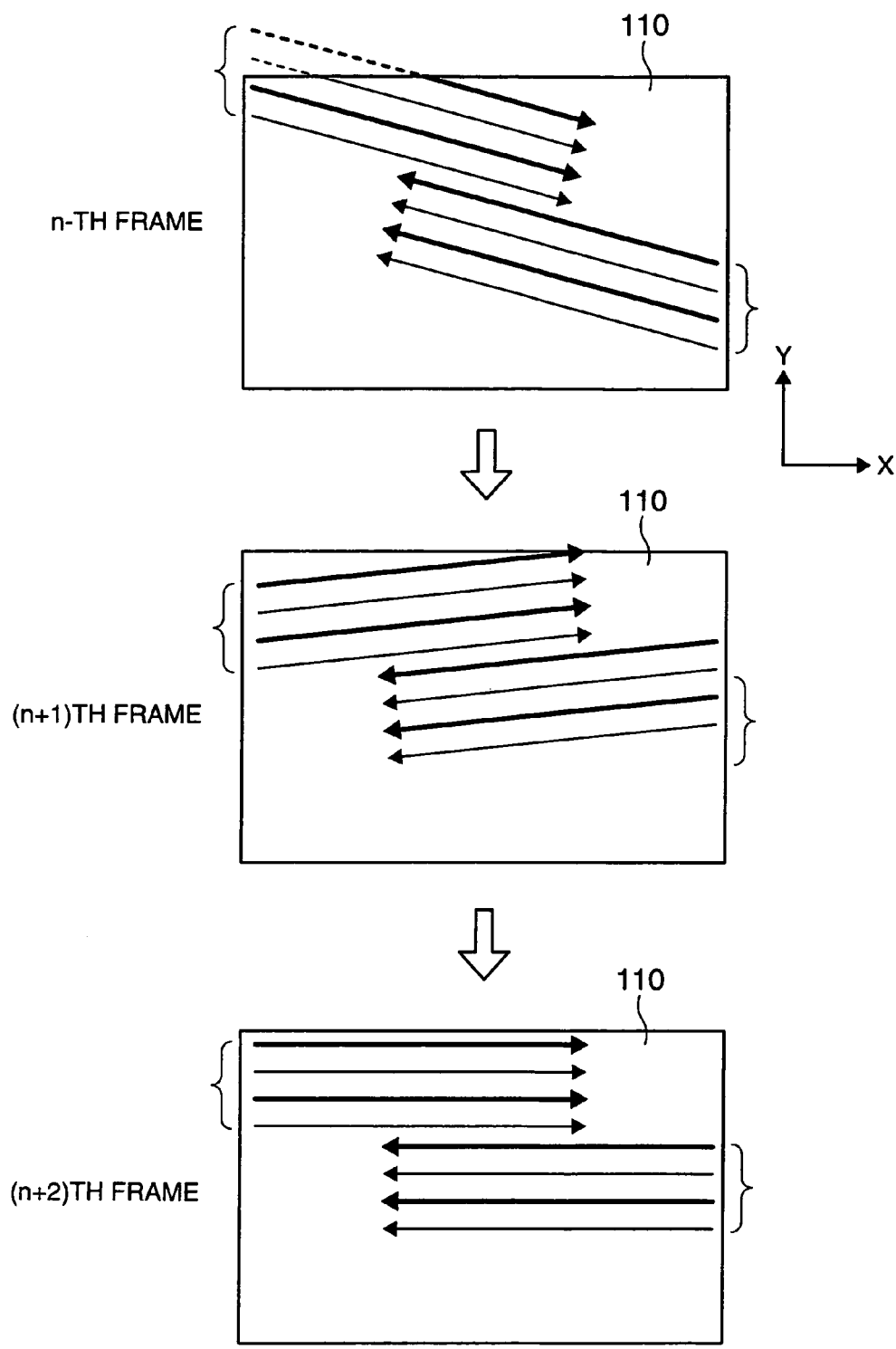
FIG. 15 is a diagram illustrating an optical scanning device according to a second embodiment of the invention.

FIG. 15 illustrates an optical scanning device according to a second embodiment of the invention, which shows a scanning mode of laser light. The optical scanning device according to this embodiment can be applied to the image display apparatus 100 according to the first embodiment described above. In the first embodiment, while laser light is scanned once in the second direction, laser light is reciprocated multiple times in the first direction substantially perpendicular to the second direction. In contrast, the optical scanning device according to this embodiment changes the first direction in which laser light is reciprocated multiple times while laser light is scanned once in the second direction. In this embodiment, whenever laser light is scanned in the second direction in the region to be irradiated, an angle of the first direction with respect to the second direction is changed. The same parts as those in the first embodiment are represented by the same reference numerals, and the descriptions thereof will be omitted. In this embodiment, like the first embodiment, the second direction is the Y direction.

Figure 16:
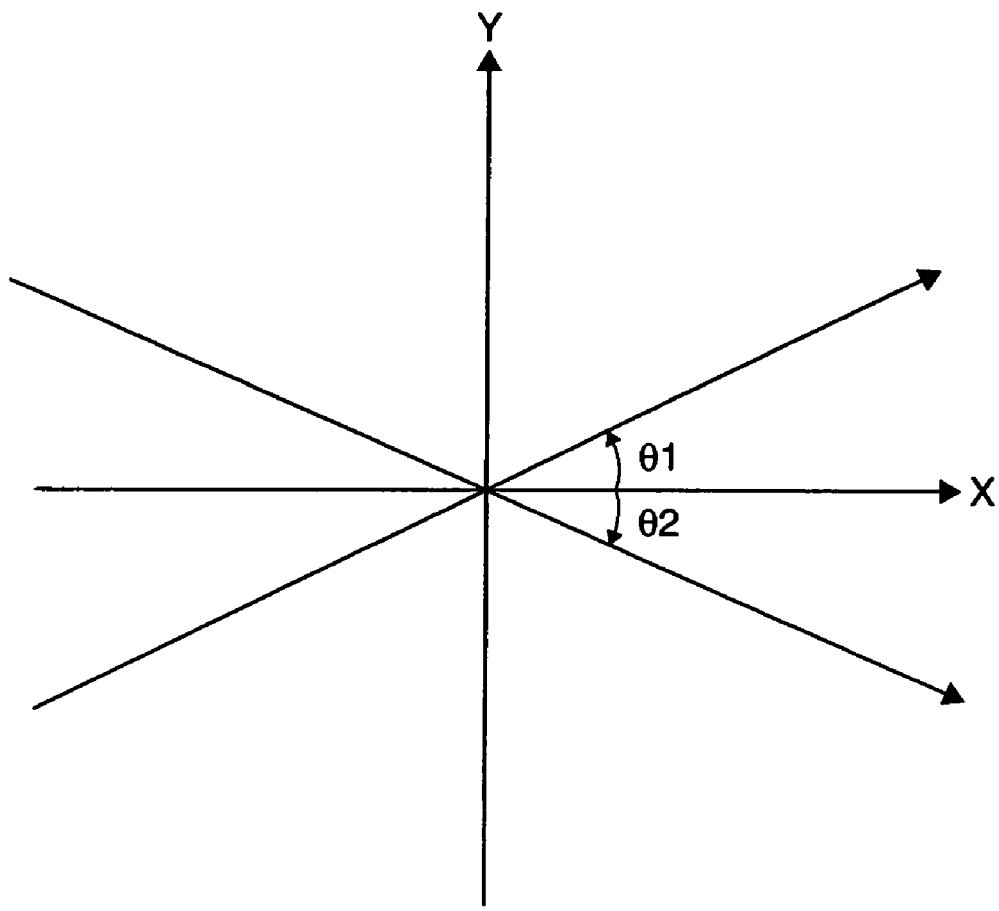
FIG. 16 is a diagram illustrating an angle range of a first direction with respect to an X direction.

In an arbitrary n-th frame, a right downward direction with respect to the X direction is set as the first direction, and then laser light is scanned. A portion indicated by a dotted line of arrows represents that the supply of laser light stops. In the next (n+1)th frame, the first direction is changed in a right upward direction. In addition, in the next (n+2)th frame, the firs direction is changed in the horizontal direction, that is, the X direction. By doing so, whenever laser light is scanned in the second direction, that is, the Y direction, in the screen 110 serving as the region to be irradiated, the angle of the first direction with respect to the second direction, that is, the Y direction is changed. In this embodiment, on the basis of the X direction perpendicular to the second direction, that is, the Y direction, the change in angle of the first direction will be described. As shown in FIG. 16, when θ1 is an angle in a counterclockwise direction with regard to the X direction and θ2 is an angle in a clockwise direction with regard to the X direction, the scanning unit changes the first direction for causing laser light to be scanned in an angle range between θ1 and θ2.

The configuration for controlling the optical scanning device is the same as the configuration of the embodiment described above shown in FIG. 10. In the ROM 725, data of the minimum and maximum values of the angle of the first direction with respect to the X direction, and the cycle at which the angle is changed are stored. The cycle can be suitably set to a value which can average the difference in intensity of laser light as time passes. For example, the cycle can be set to the time for 30 frames. Further, the angle of the first direction is based on the X direction, that is, zero degree. In addition, +θ1 shown in FIG. 16 can be set to the maximum value, and −θ2 can be set to the minimum value. For example, +θ1 and −θ2 can be set to +15 degrees and −14 degrees, respectively.

Figure 17:
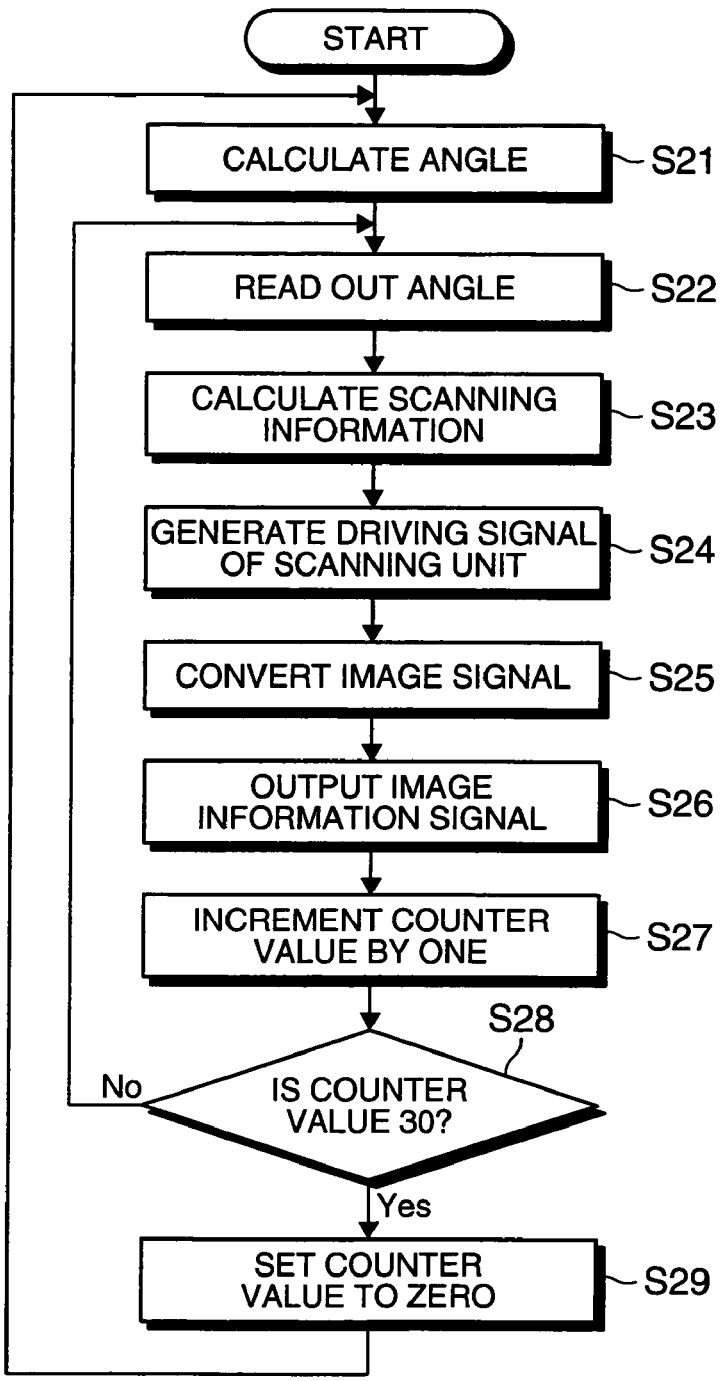
FIG. 17 is a flowchart of a process for controlling light source units for respective color light components and a scanning unit.

FIG. 17 is a flowchart of a process for controlling the light source units for the respective color light components and the scanning unit such that the angle of the first direction is changed whenever laser light is scanned in the Y direction. When the counter value referred to from the RAM 726 is 0 (zero), at a step S21, the control unit 713 calculates the angle corresponding to the counter value, and outputs the calculated angle to the RAM 726. The control unit 713 refers to the ROM 725 and generates the angle for the counter value (0 to 29), for example, as a random number for every one degree. The RAM 726 stores the counter value of the frame and the angle corresponding to the counter value.

Next, at a step S22, the control unit 713 reads out the angle (for example, +8 degrees) corresponding to the counter value 0. At a step S23, the image processing unit 721 calculates scanning information when the angle of the first direction with respect to the X direction is set to +8 degrees, and outputs the scanning information to the RAM 726. The scanning information is data, such as the deflection angle of the reflecting mirror 202, the position at which scanning of laser light in the first direction starts, the number of scanning times in the first direction of one frame, the scanning speed in the first direction, the scanning speed in the Y direction, and the like. The position at which scanning of laser light in the first direction starts can be determined by the laser light components allocated to the pixels on the outer circumference of the image and the deflection angle of the reflecting mirror 202.

At a step S24, the scanning control unit 723 generates a driving signal for driving the scanning unit 200 on the basis of the vertical synchronizing signal, the horizontal synchronizing signal, and the information stored in the RAM 726. The scanning driving unit 715 drives the scanning unit 200 in response to the driving signal from the control unit 713. At a step S25, the image processing unit 721 converts the image signal by using the calculation result of the scanning information, and outputs the converted image signal to the RAM 726. At a step S26, the light source control unit 722 outputs image information signals for every one frame on the basis of the information stored in the RAM 726.

Figure 18:
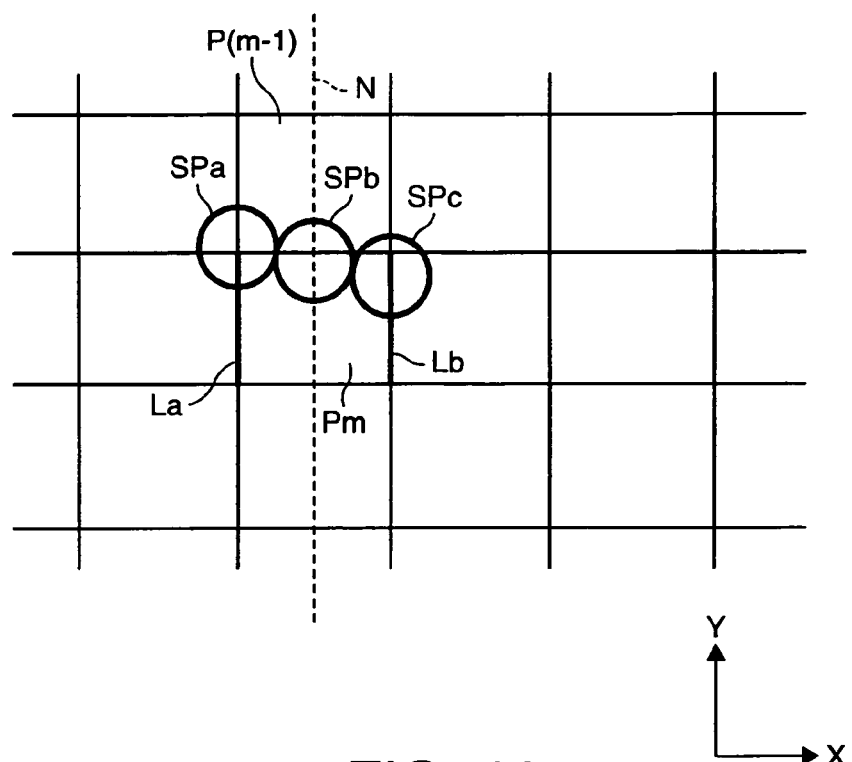
FIG. 18 is a diagram illustrating a decision of a grayscale level of laser light covering two pixels.

FIG. 18 illustrates the decision of a grayscale level when laser light is incident at a position covering two pixels. Spots SP, which are sequentially moved by laser light scanned onto the pixel Pm and the pixel P(m−1) are represented by SPa, SPb, and SPc. The pixel P(m−1) is adjacent to a plus Y side of the pixel Pm. The center point of the spot SPb is aligned with the center point of the pixel P(m−1) and a center line N passing through the center point of the pixel Pm. The center point of the spot SPa is aligned with a boundary line La on a minus X side of the pixel Pm. The center point of the spot SPc is aligned with a boundary line Lb on a plus X side of the pixel Pm.

Figure 19:
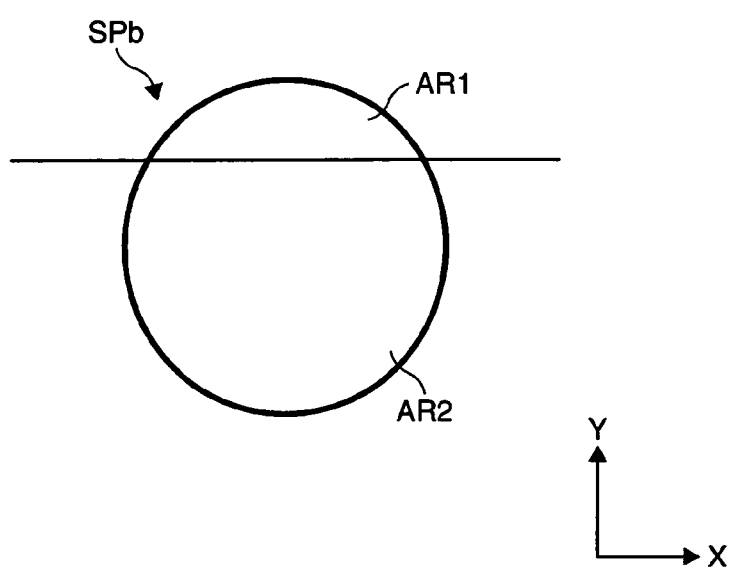
FIG. 19 is a diagram showing a spot.

FIG. 19 shows the spot SPb. Of the spot SPb, a ratio between the area of a region AR1 overlapping the pixel P(m−1) and the area of a region AR2 overlapping the pixel Pm is 3:7. When the grayscale levels to be expressed by the pixel P(m−1) and the pixel Pm according to the image signals are M(m−1) and Mm, respectively, the grayscale level Mb in the spot SPb can be determined by the following equation.

$$Mb = 0.3 \times M(m-1) + 0.7 \times Mm$$

As such, the grayscale level when laser light is incident at the position covering two pixels is determined by weighting with the ratio of the region overlapping the pixels of the spot formed in the screen 110 serving as the region to be irradiated. While moving from the spot SPa to the spot SPc, laser light is modulated so as to express the grayscale level Mb determined by the above-described equation. The invention is not limited to the case in which laser light covers the two pixels. For example, when laser light covers three or four pixels, the grayscale level is determined by weighting with the ratio of the overlap region. By converting the image signal in such a manner, even when laser light is scanned in a state of being inclined with respect to the pixels, the grayscale level can be accurately expressed at the boundary of the pixels, and accurate images can be displayed. Moreover, as for the spots SPa and SPc, like the spot SPb, the grayscale level may also be determined by weighting with the ratio of the region overlapping the pixels. In addition, in case of the first embodiment shown in FIG. 13, like this embodiment, the weighted grayscale level with the ratio of the region overlapping the pixels may also be determined.

Returning to FIG. 17, at a step S26, the light source control unit 722 outputs the image information signals for every one frame on the basis of the information stored in the RAM 726. After the image information signals are output at the step S26, at a step S27, the control unit 713 increments the counter value by 1 (one). At a step S28, when the counter value is not 30, the process returns to the step S22. When the counter value is 30 at the step S28, the counter value returns to an initial value 0 (zero) at a step S29, and the process returns to the step S21. Through these steps, while laser light is scanned at predetermined time in the Y direction in the screen 110 serving as the region to be irradiated, the angle of the first direction can be changed in a predetermined angle range.

In case of this embodiment, whenever laser light is scanned in the Y direction in the screen 110, different laser light components of the same color light component are allocated to the pixels of at least a part of the image, thereby displaying the image. Moreover, when the angle of the first direction for causing laser light to be scanned from the pattern of the (n+2)th frame shown in FIG. 15 is changed, the number of scanning times in the first direction of one frame needs to be increased. In order to increase the number of scanning times of one frame, like the first embodiment, the scanning speed may be increased without changing the time of one frame or the time of one frame may be lengthened without changing the scanning speed.

By changing the first direction in which laser light is reciprocated, different laser light components of the same color light component can be allocated to the pixels of at least a part of the image. In case of this embodiment, like the first embodiment, the difference in intensity of light beams can be averaged, and the gap of the region to be irradiated can be buried. Accordingly, scanning can be shared by using a plurality of light beams, and high-quality images can be displayed. Further, by averaging the region to be irradiated of laser light, the boundary of the pixels becomes inconspicuous, and thus natural images can be displayed. In case of this embodiment, when scanning in the Y direction is performed multiple times for every one frame, the angle of the first direction may be changed for each scanning in the Y direction of one frame.

Figure 20:
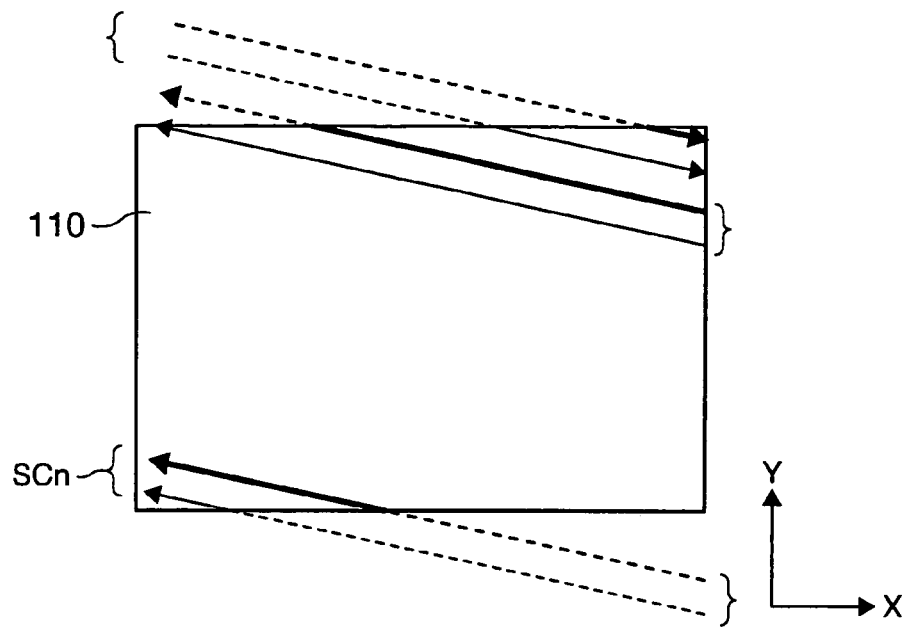
FIG. 20 is a diagram illustrating an optical scanning device according to a modification of the second embodiment of the invention.

FIG. 20 illustrates an optical scanning device according to a modification of this embodiment. In this modification, a method of determining a position starting scanning of laser light in the first direction will be described. Each of the light source units for the respective color light components according to this modification is configured such that two spots SP having a diameter substantially equal to the length of the pixel in the Y direction are arranged in a row in the Y direction. FIG. 20 shows a state in which two laser light components are scanned when a right downward direction with respect to the X direction is the first direction. First scanning in the first direction starts at a position outside the screen 110 and ends at a position on the screen 110. In this modification, outside the screen 110, the supply of laser light stops.

Figure 21:
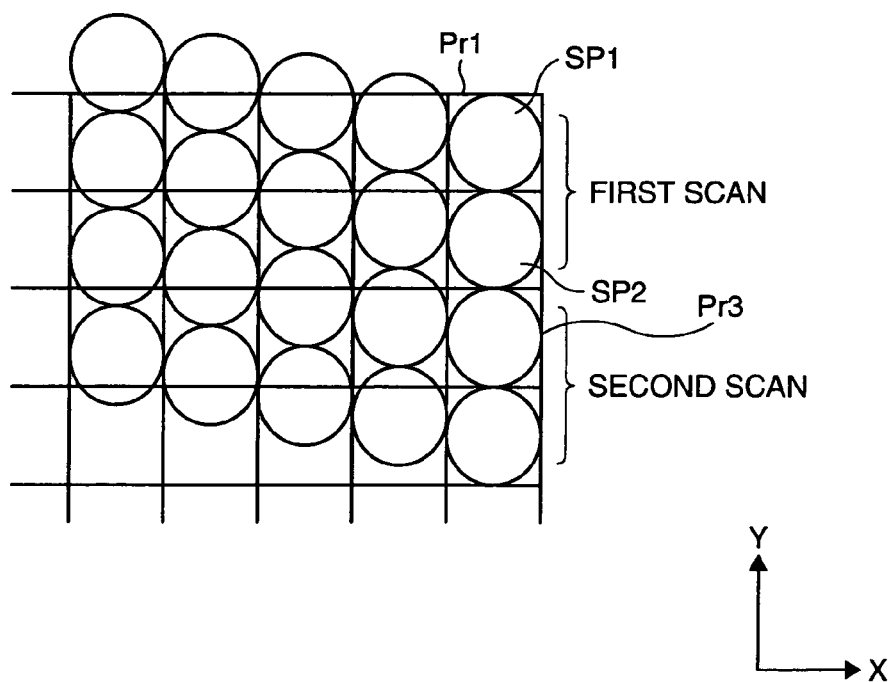
FIG. 21 is a diagram showing spots.

FIG. 21 shows the spot SP at the position at which first scanning in the first direction ends and its peripheral positions. The upper spot SP1 of the two spots moves on the pixel Pr1 on the upper right corner of the image. The position at which first scanning of laser light in the first direction starts is determined at a position at which the spot SP1 passes through the pixel Pr1. Second scanning in the first direction is determined at a position at which the spot SP1 moves on the pixel Pr3 below the pixel Pr1 by two pixels.

Figure 22:
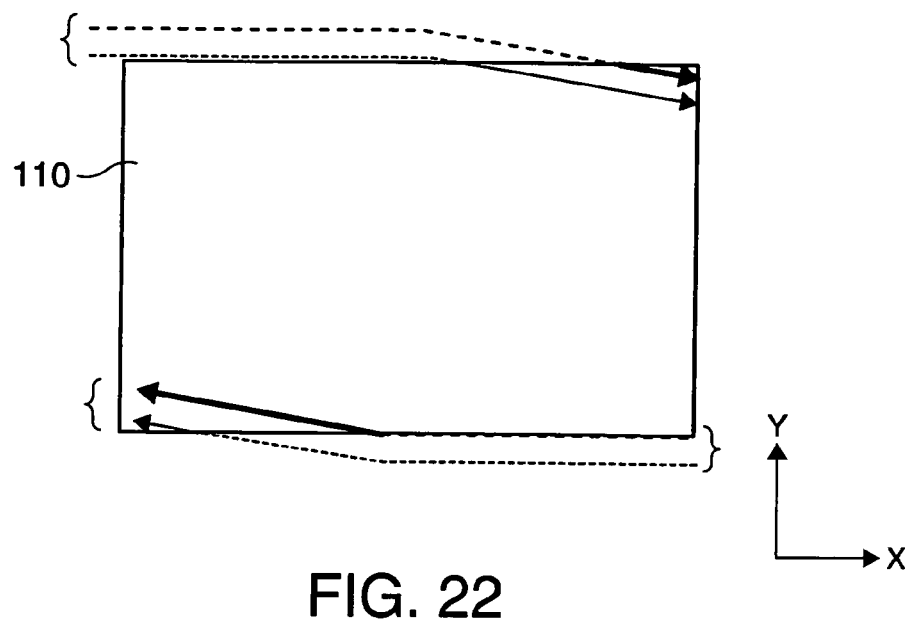
FIG. 22 is a diagram illustrating another mode for driving a scanning unit.

Returning to FIG. 20, while laser light is scanned once in the Y direction, the final scanning trace SCn in the first direction is located at a position at which the lower spot SP2 of the two spots passes through the pixel at the lower left corner of the image. The position at which final scanning of laser light in the first direction starts is determined at a position at which the spot SP2 passes through the pixel at the lower left corner of the image. By doing so, the position at which scanning of laser light in the first direction starts can be determined. Moreover, the invention is not limited to the case in which the spot SP has the diameter substantially equal to the length of the pixel. For example, when the spot SP has a diameter smaller than the length of the pixel, in the same manner as this modification, the scanning start position of laser light may be determined. Further, as shown in FIG. 22, while two laser light components are scanned outside the screen 110, the scanning unit 200 may be deflected in the horizontal direction.

Third Embodiment

Figure 23:
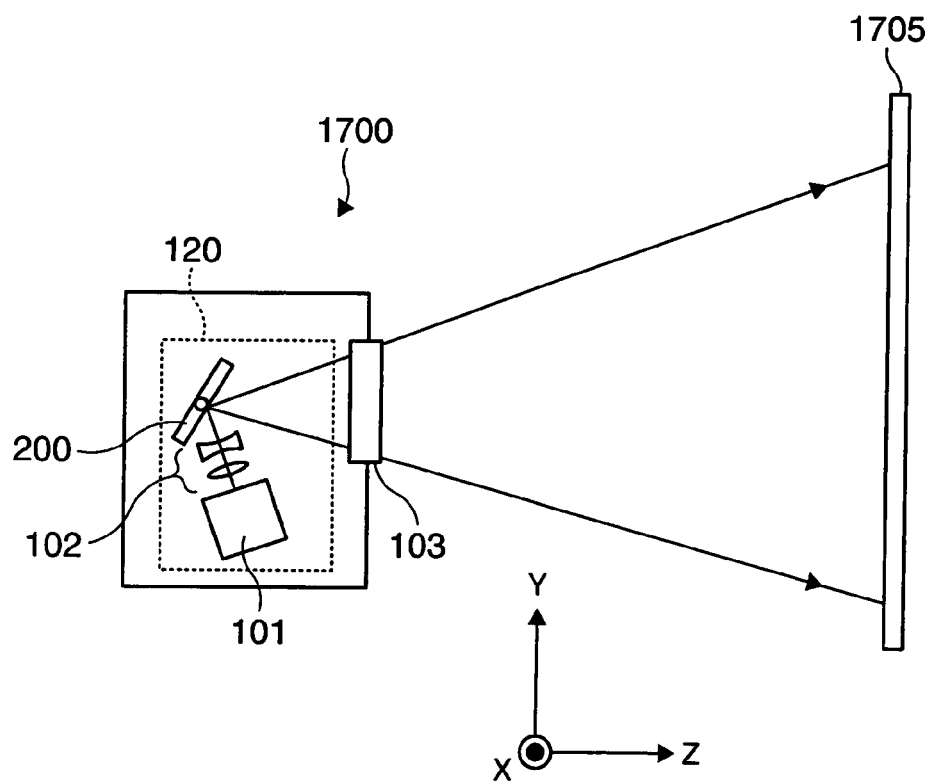
FIG. 23 is a diagram showing a schematic configuration of an image display apparatus according to a third embodiment of the invention.

FIG. 23 shows the schematic configuration of an image display apparatus 1700 according to a third embodiment of the invention. The image display apparatus 1700 is a so-called front projection-type projector which shows images by supplying laser light to a screen 1705 provided on an observer side and observing light reflected by the screen 1705. Like the first embodiment, the image display apparatus 1700 has an optical scanning device 120. The same parts as those in the first embodiment are represented by the same reference numerals, and the descriptions thereof will be omitted. Laser light from the optical scanning device 120 passes through a projection optical system 103 and then is incident on the screen 1705. In case of this embodiment, scanning can be shared by using a plurality of laser light components, and high-quality images can be displayed.

Moreover, in the respective embodiments described above, a surface emitting laser which supplies laser light is used for the light source units for the respective color light components. However, the light source unit is not limited to the surface emitting laser as long as it can supply light beams. For example, as the light source units for the respective color light components, solid light-emitting elements, such as semiconductor lasers or solid lasers, light-emitting diode elements (LED), or the like, liquid lasers, or gas lasers can be used. Further, the optical scanning device according to the invention can be used in an electronic apparatus, such as a laser printer or the like, which scans laser light, in addition to the image display apparatus.

As described above, the optical scanning device according to the invention is suitably used in the image display apparatus which scans laser light according to the image signals.

The entire disclosure of Japanese Patent Application No. 2005-205809, filed Jul. 14, 2005 is expressly incorporated by reference herein.

What is claimed is:

1. An optical scanning device which scans a plurality of color light components so as to display an image, comprising:
   a light source unit that supplies a plurality of light beams; and
   a scanning unit that repeatedly scans each light beam from the light source unit in a first direction and a second direction in a region to be irradiated, wherein:
   the scanning unit is driven such that a frequency for scanning the light beam in the first direction becomes higher than a frequency for scanning the light beam in the second direction, and such that different light beams of the same color light component are allocated to at least some pixels of the image whenever the light beam is scanned in the second direction in the region to be irradiated; and
   the scanning unit is driven such that a position in the second direction for starting scanning of the light beam in the first direction is shifted by a predetermined unit of length whenever the light beam is scanned in the second direction in the region to be irradiated.

2. The optical scanning device according to claim 1, wherein the light source unit supplies the light beams according to image signals converted such that different light beams of the same color light component are allocated to the pixels.

3. The optical scanning device according to claim 1, wherein the light source unit is configured such that spots of the light beams in the region to be irradiated are arranged in the second direction in a row.

4. The optical scanning device according to claim 1, wherein the scanning unit shifts the position in the second direction for starting scanning of the light beam in the first direction in a unit of a length substantially equal to a pixel pitch.

5. The optical scanning device according to claim 1, wherein the scanning unit shifts the position in the second direction for starting scanning of the light beam in the first direction in a unit of a length smaller than a pixel pitch.

6. The optical scanning device according to claim 1, wherein the scanning unit is driven such that an angle of the first direction with respect to the second direction is changed whenever the light beam is scanned in the second direction in the region to be irradiated.

7. The optical scanning device according to claim 6, wherein the scanning unit changes an angle of the first direction with respect to the second direction in a predetermined angle range while the light beam is scanned in the second direction in the region to be irradiated a predetermined number of times.

8. The optical scanning device according to claim 1, further comprising:
   a scanning position detecting unit that detects a position of the light beam in the region to be irradiated.

9. The optical scanning device according to claim 1, wherein, when the light beam is incident on a position covering a plurality of pixels, the light source unit modulates the light beam so as to express a weighted grayscale level by using a ratio of a region overlapping the pixels of a spot formed in the region to be irradiated by the light beam.

10. A method of controlling an optical scanning device which scans a plurality of color light components so as to display an image, the method comprising:
   supplying a plurality of light beams; and
   repeatedly scanning each light beam in a first direction and a second direction in a region to be irradiated, wherein:
   in the scanning, a frequency for scanning the light beam in the first direction is higher than a frequency for scanning the light beam in the second direction;
   whenever the light beam is scanned in the second direction in the region to be irradiated, different light beams of the same color light component are scanned to at least some pixels of the image; and
   in the scanning a position in the second direction for starting scanning of the light beam in the first direction is shifted by a predetermined unit of length whenever the light beam is scanned in the second direction in the region to be irradiated.

11. An image display apparatus which displays an image by light from an optical scanning device, wherein the optical scanning device is the optical scanning device according to claim 1.

12. An optical scanning device which scans a plurality of color light components so as to display an image, comprising:

a light source unit that supplies a plurality of light beams; and a scanning unit that repeatedly scans each light beam from the light source unit in a first direction and a second direction in a region to be irradiated, wherein:

the scanning unit is driven such that a frequency for scanning the light beam in the first direction becomes higher than a frequency for scanning the light beam in the second direction, and such that different light beams of the same color light component are allocated to at least some pixels of the image whenever the light beam is scanned in the second direction in the region to be irradiated; and the scanning unit is driven such that an angle, which is selected from a predetermined angle range, of the first direction with respect to the second direction is changed each time whenever the light beam is scanned in the second direction in the region to be irradiated.

13. The optical scanning device according to claim 12, wherein the scanning unit changes an angle of the first direction with respect to the second direction in a predetermined angle range while the light beam is scanned in the second direction in the region to be irradiated a predetermined number of times.

14. The optical scanning device according to claim 12, further comprising:

a scanning position detecting unit that detects a position of the light beam in the region to be irradiated.

15. The optical scanning device according to claim 12, wherein, when the light beam is incident on a position covering a plurality of pixels, the light source unit modulates the light beam so as to express a weighted grayscale level by using a ratio of a region overlapping the pixels of a spot formed in the region to be irradiated by the light beam.

* * * * *